United States Patent
Sato et al.

(10) Patent No.: US 8,064,603 B2
(45) Date of Patent: Nov. 22, 2011

(54) INFORMATION TERMINAL

(75) Inventors: Jun Sato, Kawasaki (JP); Keiko Watanabe, Fuchu (JP); Toru Terauchi, Tokyo (JP)

(73) Assignee: Kabushiki Kaisha TOSHIBA, Tokyo (JP)

( * ) Notice: Subject to any disclaimer, the term of this patent is extended or adjusted under 35 U.S.C. 154(b) by 1171 days.

(21) Appl. No.: 11/497,734

(22) Filed: Aug. 2, 2006

(65) Prior Publication Data

US 2007/0124245 A1    May 31, 2007

(30) Foreign Application Priority Data

Nov. 29, 2005   (JP) .................................. 2005-343995

(51) Int. Cl.
*H04K 1/00*     (2006.01)
*H04L 1/00*     (2006.01)

(52) U.S. Cl. ........................................ 380/277; 726/27
(58) Field of Classification Search .................. 380/277; 726/27
See application file for complete search history.

(56) References Cited

U.S. PATENT DOCUMENTS

| | | | | |
|---|---|---|---|---|
| 5,758,069 A | * | 5/1998 | Olsen ............................... | 726/27 |
| 5,925,127 A | * | 7/1999 | Ahmad ............................ | 726/31 |
| 5,982,889 A | * | 11/1999 | DeMont ......................... | 705/51 |
| 5,982,891 A | | 11/1999 | Ginter et al. | |
| 6,141,754 A | * | 10/2000 | Choy ............................... | 726/1 |
| 6,144,959 A | * | 11/2000 | Anderson et al. ..................... | 1/1 |
| 6,170,014 B1 | * | 1/2001 | Darago et al. ................ | 709/229 |
| 6,173,403 B1 | * | 1/2001 | DeMont ........................ | 713/185 |
| 6,219,652 B1 | * | 4/2001 | Carter et al. ..................... | 705/59 |
| 6,282,573 B1 | * | 8/2001 | Darago et al. ................ | 709/229 |
| 6,343,280 B2 | * | 1/2002 | Clark ............................. | 705/55 |
| 6,581,044 B1 | * | 6/2003 | Alur ................................ | 705/59 |
| 6,606,664 B2 | * | 8/2003 | Darago et al. ................ | 709/229 |
| 6,718,470 B1 | * | 4/2004 | Adams ............................ | 726/10 |
| 7,024,561 B2 | | 4/2006 | Inoha et al. | |
| 7,191,343 B2 | | 3/2007 | Tuoriniemi et al. | |
| 7,203,966 B2 | | 4/2007 | Abburi et al. | |
| 7,260,557 B2 | * | 8/2007 | Chavez .......................... | 705/59 |
| 7,263,497 B1 | * | 8/2007 | Wiser et al. ..................... | 705/26 |
| 7,266,815 B2 | * | 9/2007 | Butt et al. ....................... | 717/168 |
| 7,346,170 B2 | * | 3/2008 | Asano et al. .................. | 380/278 |
| 7,392,420 B2 | * | 6/2008 | Butt et al. ........................ | 714/2 |
| 7,415,439 B2 | | 8/2008 | Kontio et al. | |
| 7,487,363 B2 | | 2/2009 | Alve et al. | |

(Continued)

FOREIGN PATENT DOCUMENTS

JP         02-260841 A        10/1990

(Continued)

OTHER PUBLICATIONS

Extended European Search Report dated Jul. 24, 2009 (6 pages), issued in counterpart European Application Serial No. 06016104.9.

(Continued)

*Primary Examiner* — Evens J Augustin
(74) *Attorney, Agent, or Firm* — Holtz, Holtz, Goodman & Chick, PC

(57) ABSTRACT

When content owned by a source device are played back in a rendering device, a content key is transferred from the source device to the rendering device via a secure session every time playback is carried out. Then, encoded content are decoded and played back to be outputted by using the transferred content key so as to discard the content key after the end of playback.

21 Claims, 16 Drawing Sheets

U.S. PATENT DOCUMENTS

| | | | |
|---|---|---|---|
| 7,487,547 B2 | 2/2009 | Nakai et al. | |
| 7,512,798 B2 * | 3/2009 | Cahill et al. | 713/170 |
| 7,571,143 B2 * | 8/2009 | Circenis et al. | 705/400 |
| 7,780,523 B2 * | 8/2010 | Baerlocher et al. | 463/26 |
| 7,788,181 B2 * | 8/2010 | Ben-Menahem et al. | 705/59 |
| 7,814,551 B2 * | 10/2010 | Darweesh et al. | 726/26 |
| 7,841,939 B2 * | 11/2010 | Baerlocher et al. | 463/25 |
| 7,849,100 B2 * | 12/2010 | Brown et al. | 707/783 |
| 7,862,430 B2 * | 1/2011 | Baerlocher et al. | 463/29 |
| 7,905,778 B2 * | 3/2011 | Breckner et al. | 463/26 |
| 7,945,690 B2 * | 5/2011 | Daigle et al. | 709/231 |
| 7,963,847 B2 * | 6/2011 | Baerlocher | 463/27 |
| 2003/0023564 A1 * | 1/2003 | Padhye et al. | 705/54 |
| 2003/0167392 A1 * | 9/2003 | Fransdonk | 713/156 |
| 2004/0128252 A1 * | 7/2004 | Shirai et al. | 705/59 |
| 2004/0168077 A1 * | 8/2004 | Waxman et al. | 713/200 |
| 2004/0243819 A1 * | 12/2004 | Bourne et al. | 713/193 |
| 2005/0210249 A1 | 9/2005 | Lee et al. | |
| 2005/0257074 A1 * | 11/2005 | Alkove et al. | 713/193 |
| 2006/0018474 A1 * | 1/2006 | Hori et al. | 380/255 |
| 2006/0021063 A1 * | 1/2006 | Hori | 726/27 |
| 2006/0069652 A1 * | 3/2006 | Ebihara et al. | 705/59 |
| 2006/0149683 A1 | 7/2006 | Shimojima et al. | |
| 2006/0174110 A1 * | 8/2006 | Strom et al. | 713/165 |
| 2006/0260923 A1 | 11/2006 | Lee et al. | |
| 2007/0121942 A1 | 5/2007 | Watanabe et al. | |
| 2007/0203839 A1 | 8/2007 | Terauchi et al. | |
| 2008/0216177 A1 * | 9/2008 | Yokosato et al. | 726/26 |
| 2009/0055935 A1 * | 2/2009 | Tsurukawa | 726/26 |

FOREIGN PATENT DOCUMENTS

| | | |
|---|---|---|
| JP | 10-208388 A | 8/1998 |
| JP | 2001-309332 A | 11/2001 |
| JP | 2003-008563 A | 1/2003 |
| JP | 2003-110541 A | 4/2003 |
| JP | 2003-303137 A | 10/2003 |
| JP | 2004-048180 A | 2/2004 |
| JP | 2004-112042 A | 4/2004 |
| JP | 2004-350150 A | 12/2004 |
| JP | 2005-094481 A | 4/2005 |

OTHER PUBLICATIONS

U.S. Appl. No. 11/406,212, filed Apr. 18, 2006; T. Terauchi, et al entitled: Mobile Communication Terminal.

Related U.S. Appl. No. 11/497,732, filed Aug. 2, 2006, Title of Invention: Information Terminal, Inventors: Keiko Watanabe et al.

Japanese Office Action dated Apr. 21, 2009 (3 pages), and English translation thereof 5 pages) issued in counterpart Japanese Application No. 2005-343995.

K. Seki et al., "A Proposal of a New Distribution Scheme for Software Products," Information Processing Society Research Report (93-IS-45), Japan, Information Processing Society of Japan. Jul. 20, 1993, vol. 93, No. 64, p. 19 to 28.

* cited by examiner

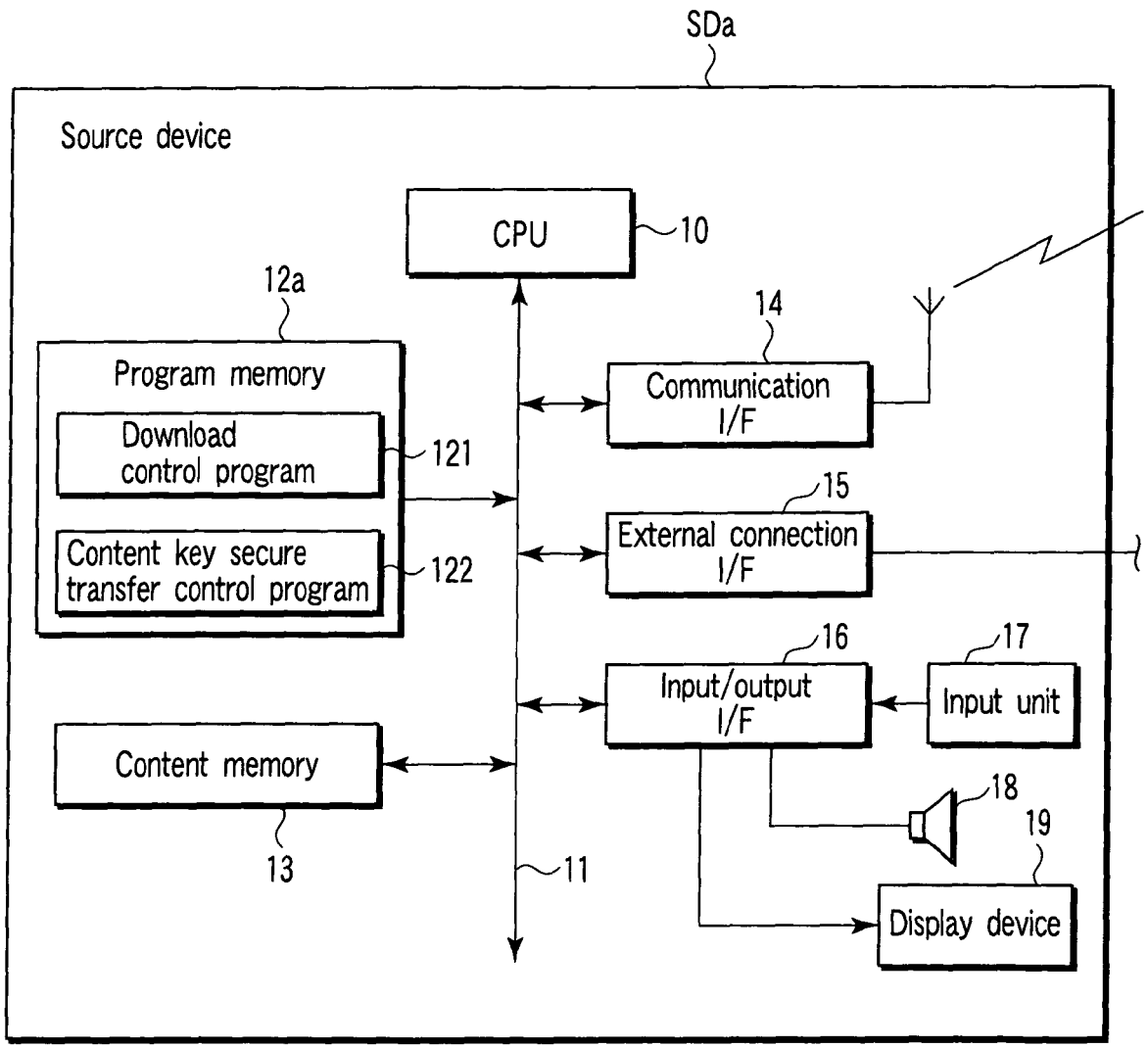
F I G. 2

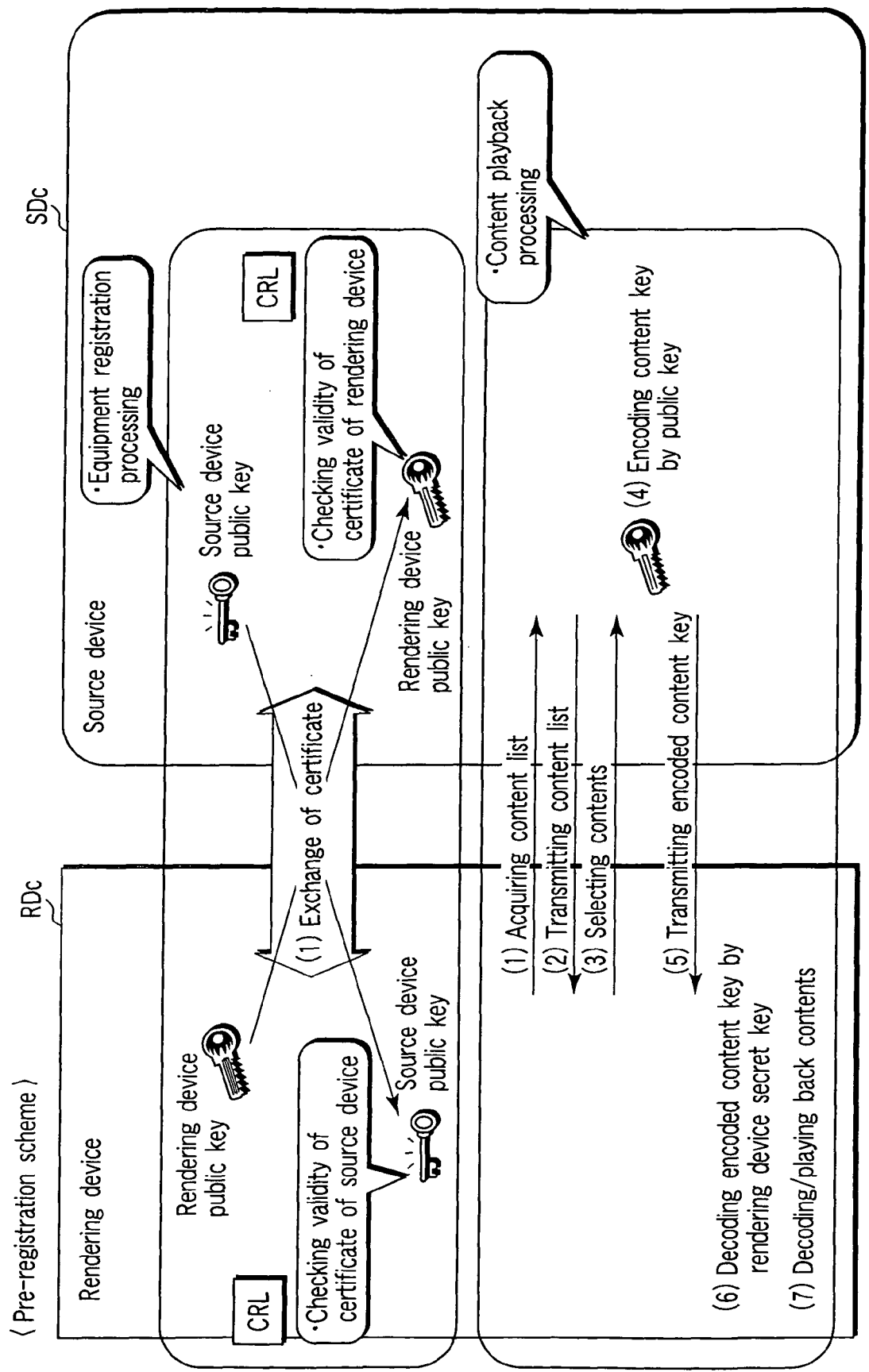
F I G. 14

INFORMATION TERMINAL

CROSS-REFERENCE TO RELATED APPLICATIONS

This application is based upon and claims the benefit of priority from prior Japanese Patent Application No. 2005-343995, filed Nov. 29, 2005, the entire contents of which are incorporated herein by reference.

BACKGROUND OF THE INVENTION

1. Field of the Invention

The present invention relates to an information terminal used in a content playing back system. And that the content playing system shares rights of content acquired from, for example, a content server by a plurality of information terminals to enable playback by the respective information terminals.

2. Description of the Related Art

In recent years, there has been prevalent a distribution service for downloading rich content such as audio content from a content server to an information terminal device such as a cellular phone or a personal computer. In the device utilizing this kind of service, the downloaded content are temporarily stored in a memory, and the stored content are read out and played back from the memory in response to a user's playing back operation.

In some cases, rights information for protecting a copyrights or the like is assigned to content. The kind of content are encoded and stored, and, at the time of playback, the encoded content are decoded and played back under a condition specified by rights information. The playback condition includes, for example, a playback count or a playback period. As an encoding system, there is used, for example, a system of encoding content by a content key made of random numbers or a system of encoding the content key by a binding key. Such a binding key is generated by, for example, specific identification information of a device of content and a secret key of the device. By using such an encoding system, content are obtained in a specific device bound state, whereby playback of content can be limited to a device having the content encoded therein.

In the meantime, recently, there have been proposed a variety of devices for sharing a rights of the acquired content with another person and transferring or dividing and assigning the rights to such another person. For example, techniques for transferring a rights include: transferring content bound by specific identification information of a device from a device serving as a transfer source to another device serving as a transfer destination and transferring the specific identification information via a secure transmission channel, thereby enabling use of the specific identification information by a device serving as a transfer destination after transferred and disabling use of the specific identification information by the terminal serving as a transfer source (refer to, for example, Jpn. Pat. Appln. KOKAI Publication No. 2003-303137).

Further, a content distribution standard using a PKI (Public Key Infrastructure) is standardized as a method for sharing rights. For example, a Digital Rights Management v2 specification or the like standardized by an Open Mobile Alliance (TM) can be exemplified. In this specification, content are defined by encoded content and a rights object that includes rights information for using the encoded content and a key used at the time of encoding content. The encoded content are distributed from a rights server, and the associated rights information is distributed from the rights server to a client server, respectively. In addition, the client device has a pair of public keys that is composed of certificates with a secret key and a public key, and the rights information is encoded by using a public key of the client device.

In this standard, a content sharing function called a domain is introduced. This function regards a set of the client devices registered in the rights server as a domain, and can share content as long as they are in the domain. A specific mechanism is configured as follows, for example.

That is, the client device registers a domain by sending the client device's certificate to the rights server. The rights server issues a domain key encoded by the client device's public key from the rights server after checking validity of the client server's certificate. The client device decodes the domain key by the secret key, and securely stores it. Further, rights information for domains is encoded by using the domain key described previously, and the client device acquires participating rights information for domains, thereby decoding a content key by using the securely stored domain key. Further, content of a plain text can be acquired by decoding content by using the content key. As a result, the acquired content can be played back.

However, the technique disclosed in Jpn. Pat. Appln. KOKAI Publication No. 2003-303137 disables use of specific identification information by a terminal serving as a transfer source with transfer of the rights of content. In the device serving as the transfer source as well, there is a problem that a change of the specific identification information is unavoidable. On the other hand, it is necessary to register a method for sharing content using a domain in the rights server. For this reason, there is a problem that sharing content and selecting a rendering device cannot be easily carried out by a user's intention and preference.

BRIEF SUMMARY OF THE INVENTION

The present invention has been made in view of the above-described circumstance. It is an object of the present invention to provide an information terminal that enables one content playback or execution every time key information is transferred when shared content are played back or executed in a rendering terminal.

According to a first aspect of the present invention, a secure session is first established between a source terminal and a rendering terminal to generate a common key when content owned by the source terminal are played back in the rendering terminal. Then, the source terminal encodes, by the common key, key information included in a rights object that corresponds to encoded content targeted for the playback, and transfers the encoded key information to the rendering terminal via the secure session. On the other hand, the rendering terminal first decodes the encoded key information transferred from the source terminal by using the common key, and decodes and plays back the encoded content by using the decoded encode key information. After terminating playback of the decoded content, the encoded key information is discarded.

According to a second aspect of the present invention, when content owned by a source terminal are played back in a rendering terminal, the source terminal acquires a public key of the rendering terminal from the rendering terminal, encodes, by the public key, key information included in a rights object that corresponds to encoded content targeted for playback, and transmits the encoded key information to the rendering terminal. On the other hand, the rendering terminal decodes the encode key information transmitted from the source terminal by a secret key paired with the public key, and decodes and plays back the encoded content targeted for playback by using the decoded key information. After terminating playback of the decoded content, the key information is discarded.

According to a third aspect of the present invention, public keys are exchanged and stored between a source terminal and a rendering terminal in advance. When content owned by the source terminal are played back in the rendering terminal, the source terminal encodes key information included in a rights object that corresponds to encoded content targeted for playback by using the stored public key of the rendering terminal, and transmits the encoded key information to the rendering terminal. On the other hand, the rendering terminal first decodes the encode key information transmitted from the source terminal by a secret key paired with the public key of the rendering terminal, and decodes and plays back the encoded content targeted for playback by using the decoded key information. After terminating playback of the decoded content, the key information is discarded.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram depicting a configuration of a source device for use in the content playing back system according to the first embodiment of the invention;

FIG. 14 is a sequence diagram for explaining a content playing back operation in the content playing back system according to the third embodiment of the invention;

DETAILED DESCRIPTION OF THE INVENTION

First Embodiment

Figure 1:
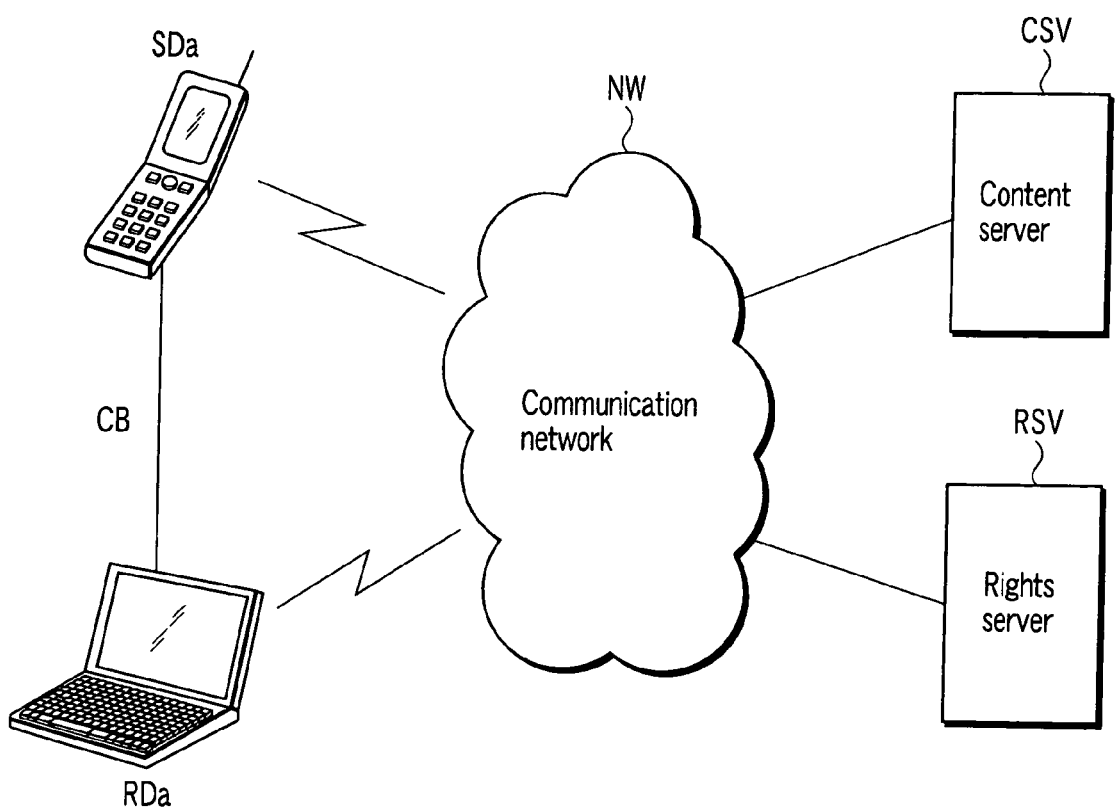
FIG. 1 is a schematic diagram showing a configuration of a content playing back system according to a first embodiment of the present invention.

FIG. 1 is a schematic diagram showing a configuration of a content playing back system according to a first embodiment of the present invention, wherein SDa denotes a source terminal (source device) serving as a rights assignment source and RDa denotes a rendering terminal (rendering device) serving as a rights assignment destination, respectively. These source device SDa and rendering device RDa each are composed of, for example, a mobile terminal or a personal computer, which is accessible to a content server CSV and a rights server RSV via a communication network NW.

The source device SDa holds a public key pair of a secret key for use in distribution of content and a public key with a certificate. Then, the source device SDa delivers a certificate including a public key to the rights server RSV in order to register one's own in the rights server RSV. The rights server RSV checks validity of a certificate. In the case where the validity has been certificated, registration processing of the source device SDa is carried out.

The source device SDa downloads desired encoded content EC from the content server CSV and downloads a rights object (RO) that corresponds to the downloaded encoded content EC from the rights server RSV. Then, the downloaded encoded content EC and the rights object RO are stored in a storage medium.

The rights object is encoded entirely or partly by using a public key of the source device SDa. That is, decoding can be carried out only by a secret key paired with the public key utilized for the encoding. Therefore, the encoded rights object RO enters a state in which the object is bound with the source device SDa. For this reason, utilization of the rights object RO is limited to the source device SDa. In addition, the rights object RO houses, for example, information representing the content of rights assigned to the corresponding encoded content and a content key Kc for decoding the encoded content EC. As described previously, the rights object RO is encoded entirely or partly by a public key of the source device SDa, and enters a state in which its validity and secrecy are protected.

Examples of a mechanism of distributing the encoded content include a Digital Rights Management v2 specification standardized by an Open Mobile Alliance (™).

On the other hand, the rendering device RDa downloads the encoded content EC from the content server CSV and acquires a content key Kc of the encoded content EC from the source device SDa via a signal cable CB such as a universal serial bus (USB) cable, in order to share desired content in the encoded content owned by the source device SDa.

The communication network NW is composed of an Internet protocol (IP) network represented by, for example, the Internet, and a plurality of access networks for providing an access to the IP network. As the access network, there is employed a wired subscriber network using a digital subscriber line (DSL) or an optical transmission channel, a wireless local area network (LAN), or a mobile communication network.

As another embodiment, the rendering device RDa is directly connected to the source device SDa via the signal cable CB, whereby encoded content EC may be shared. As still another embodiment, the sharing of encoded content between the source device SDa and the rendering device RDa may be carried out via a removable medium of mount/demount type.

Further, as still another embodiment, the signal cable C interposed between the source device SDa and the rendering device RDa may be a serial connection cable, a parallel connection cable, an IIEEE1394 cable, an Ethernet (registered trademark) cable or the like without being limited to the USB cable. The signal cable may be wirelessly connected without being limited to wired cable connection. For example, it may be, for example, a peer-to-peer type wireless connection mode such as infrared-ray communication, or a network type connection mode such as Bluetooth (registered trademark) or wireless LAN.

In the meantime, the source device SDa is configured as follows. FIG. 2 is a block diagram depicting a configuration of the device.

That is, a program memory 12a and a content memory 13 are connected to a central processing unit (CPU) 10 via a bus 11, and further, a communication interface 14, an external connection interface 15, and an input/output interface 16 are connected thereto, respectively.

The content memory 13 uses, for example, a NAND type flash memory, a hard disk, or a removable medium as a storage medium. The content memory 13 stores the encoded content EC downloaded from the content server CSV and the rights object RO downloaded from the rights server RSV so to be associated with each other.

The communication interface 14 comprises, for example, a wireless interface for making communication with a cellular wireless communication system or a wireless LAN, and makes wireless communication with the communication network NW under the control of the CPU 10. The external connection interface 15 comprises, for example, a USB interface function and transfers an encoded content key EKc to the rendering device RDa via the communication cable CB.

An input unit 17 such as a keyboard or a mouse, an audio output speaker 18, and a display device 19 such as an LCD display are connected to the input/output interface 16. The input unit 17 is used for a user to input operation information. The speaker 18 and the display device 19 are used to vocally output or display music content or video content, respectively. The display device 19 is also used for displaying a variety of operation states of a device.

The program memory 12a is configured by a nonvolatile memory such as a hard disk or a ROM. The program memory 12a stores a download control program 121 and a content key secure transfer control program 122 as control application programs according to the present invention.

The download control program 121 first provides an access to the content server CSV and the rights server RSV via the communication network NW, and downloads the desired encoded content EC and rights object RO, respectively, from these servers CSV and RSV. Then, the downloaded encoded content EC and the rights object RO are associated with each other to cause the CPU 10 to execute a processing of storing them in the content memory 13.

The content key secure transfer control program 122 causes the CPU 10 to execute a processing of securely transferring the corresponding content key Kc to the rendering device RDa in the case where a request for playing back content from the rendering device RDa has occurred. Specifically, the rights object RO is first read out from the content memory 13, the read-out object is decoded by a source device secret key, and the content key Kc is extracted from the decoded rights object RO. A secure session is established with respect to the rendering device RDa, the content key Kc is encoded by using the session key Sk, and then, the encoded key is transmitted to the rendering device RDa.

Figure 3:
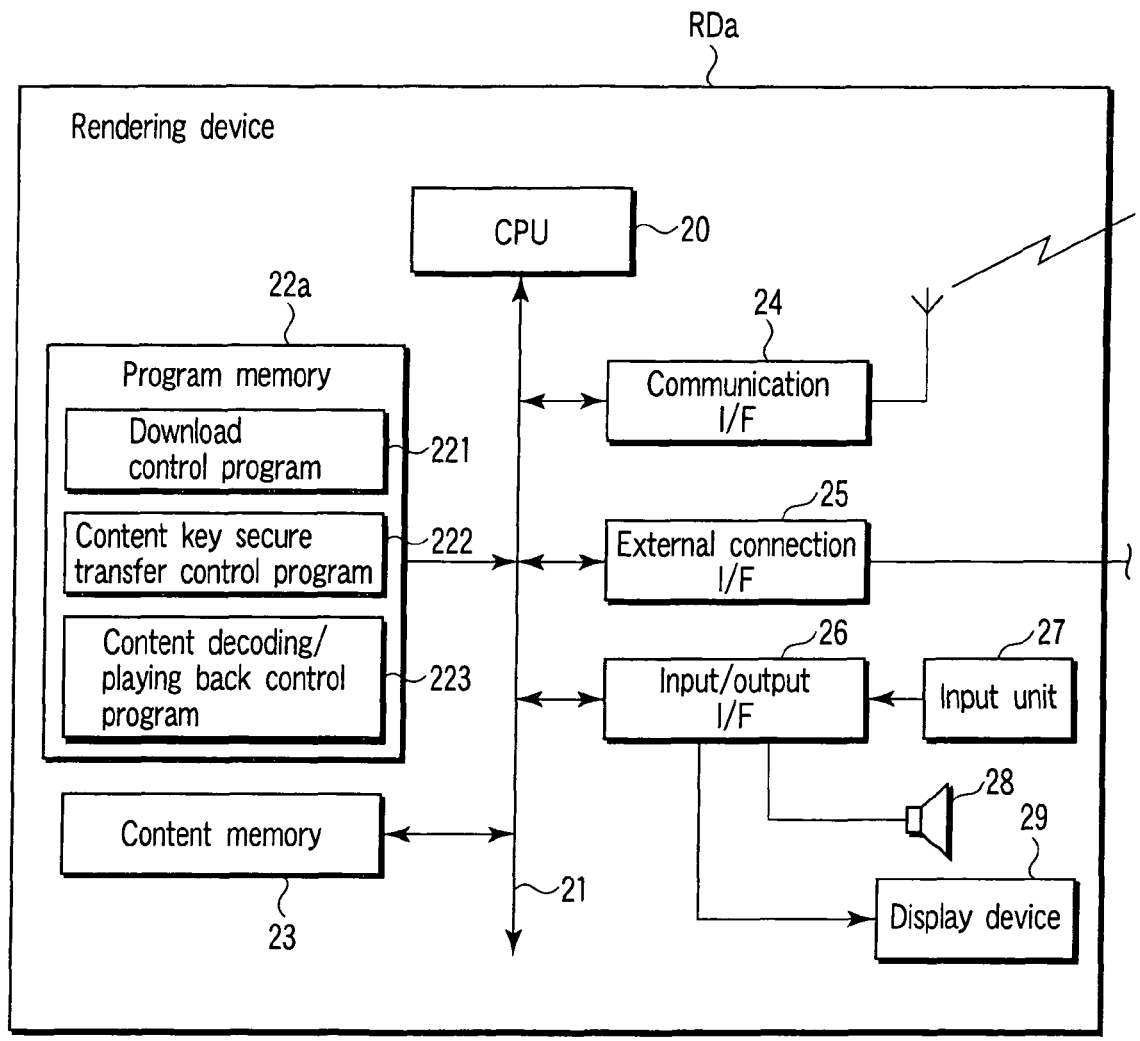
FIG. 3 is a block diagram depicting a configuration of a rendering device for use in the content playing back system according to the first embodiment of the invention.

On the other hand, the rendering device RDa is configured as follows. FIG. 3 is a block diagram depicting a configuration of the device.

That is, the rendering device RDa also includes a CPU 20 in the same manner as the source device SDa. A program memory 22a and a content memory 23 are connected to the CPU 20 via a bus 21, and further, a communication interface 24, an external connection interface 25, and an input/output interface 26 are connected thereto, respectively.

The content memory 23 is used to store downloaded encoded content EC from the content server CSV, the source device SDa and the like. The communication interface 24 comprises a wireless interface for making communication with a cellular wireless communication system or a wireless LAN, and makes wireless communication with the communication network NW under the control of the CPU 20. The external connection interface 25 comprises a USB interface function, and is used to receive an encoded content key EKc from the source device SDa. An input unit 27 such as a keyboard or a mouse, an audio output speaker 28, and a display device 29 such as an LCD display are connected to the input/output interface 26.

The program memory 22a is configured by a nonvolatile memory such as a hard disk or a ROM. The program memory 22a stores a download control program 221, a content key secure transfer control program 222, and a content decoding/playing back control program 223 as control application programs according to the present invention.

The download control program 221 causes the CPU 20 to execute the following processing. That is, an access is provided to the content server CSV via the communication network NW or an access is provided to the source device SDa via the signal cable CB. Then, encoded content EC targeted to be shared are downloaded from the content server CSV, and the downloaded encoded content EC are stored in the content memory 23.

The content key secure transfer control program 222 causes the CPU 20 to execute the following processing. That is, when an attempt is made to play back the encoded content EC shared with the source device SDa by means of its own device RDa, a secure session is established with respect to the source device SDa, and a content key Kc of the encode content EC is acquired from the source device SDa. Then, the acquired encoded content key EKc is decoded by using a session key Sk.

The content decoding/playing back control program 223 causes the CPU 20 to execute the following processing. That is, first, the encoded content EC stored in the content memory 23 are decoded by using the decoded content key Kc. Then, the decoded content C are supplied to the input/output interface 26 to be loudly outputted or displayed from the speaker 28 or the display device 29.

Now, an operation of the content playing back system configured above will be described here.

Figure 4:
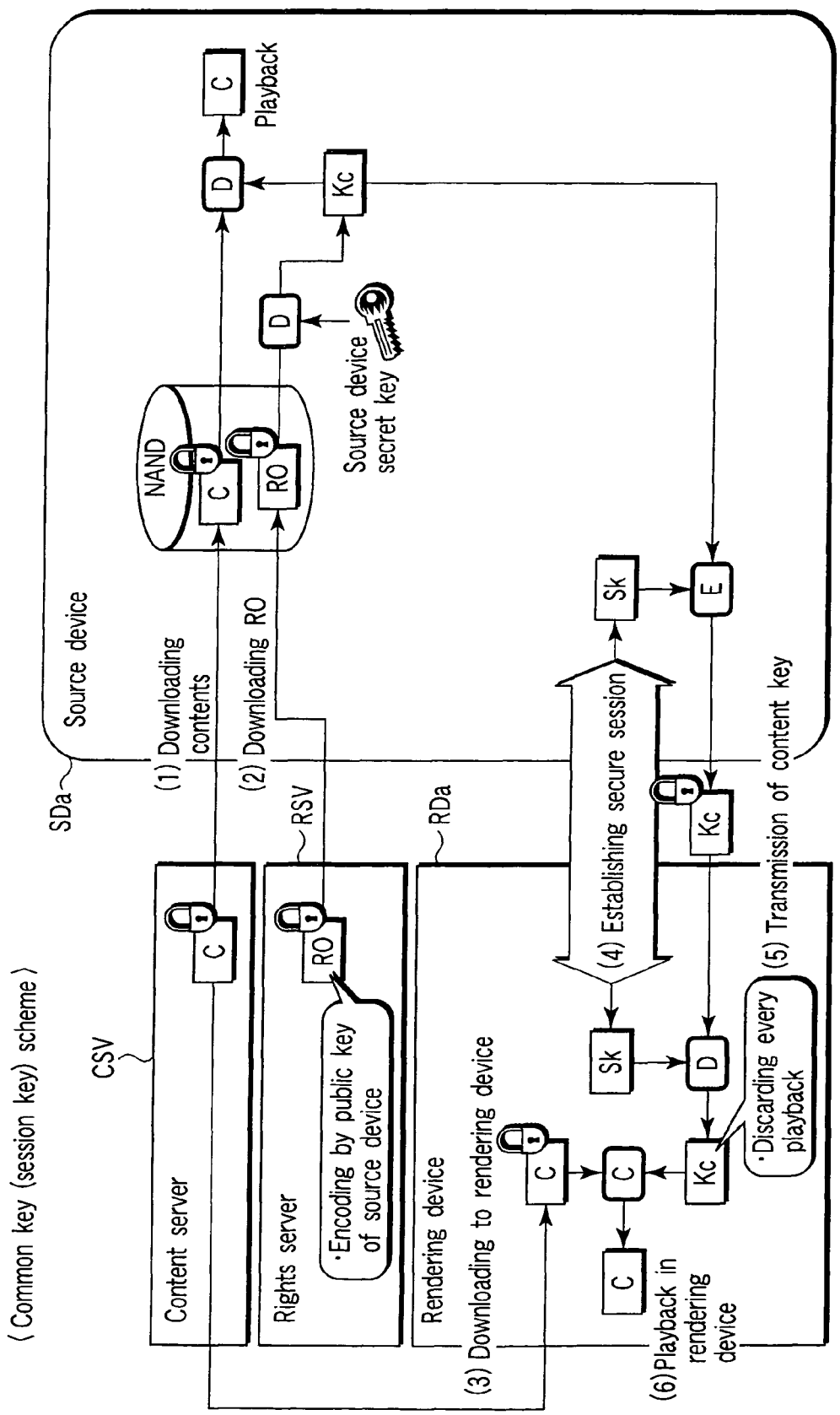
FIG. 4 is a sequence diagram for explaining a content playing back operation in the content playing back system according to the first embodiment of the invention.
Figure 5:
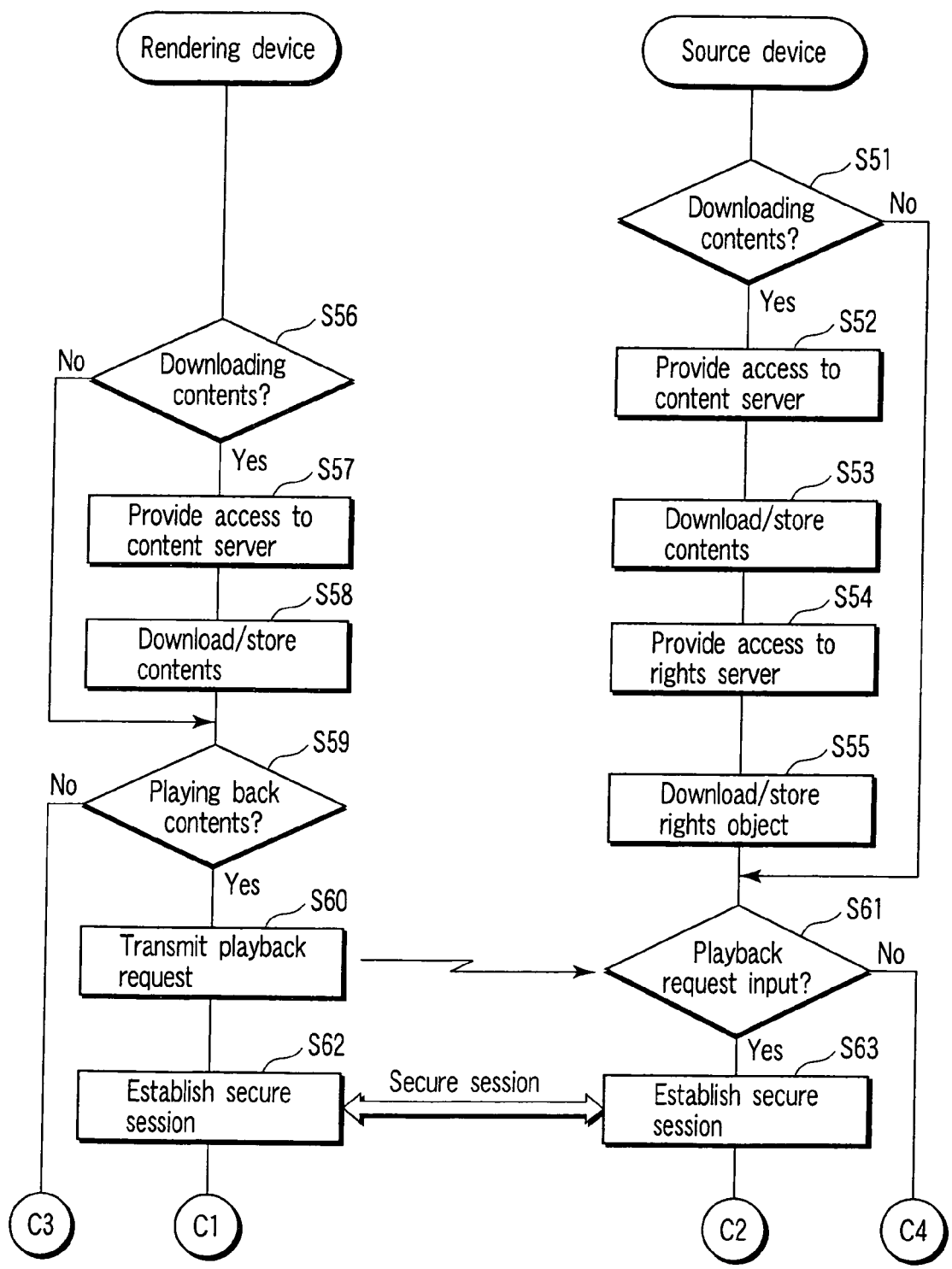
FIG. 5 is a flow chart showing a first-half portion of procedures for, and content of, content playback control by the source device shown in FIG. 2 and the rendering device shown in FIG. 3.
Figure 6:
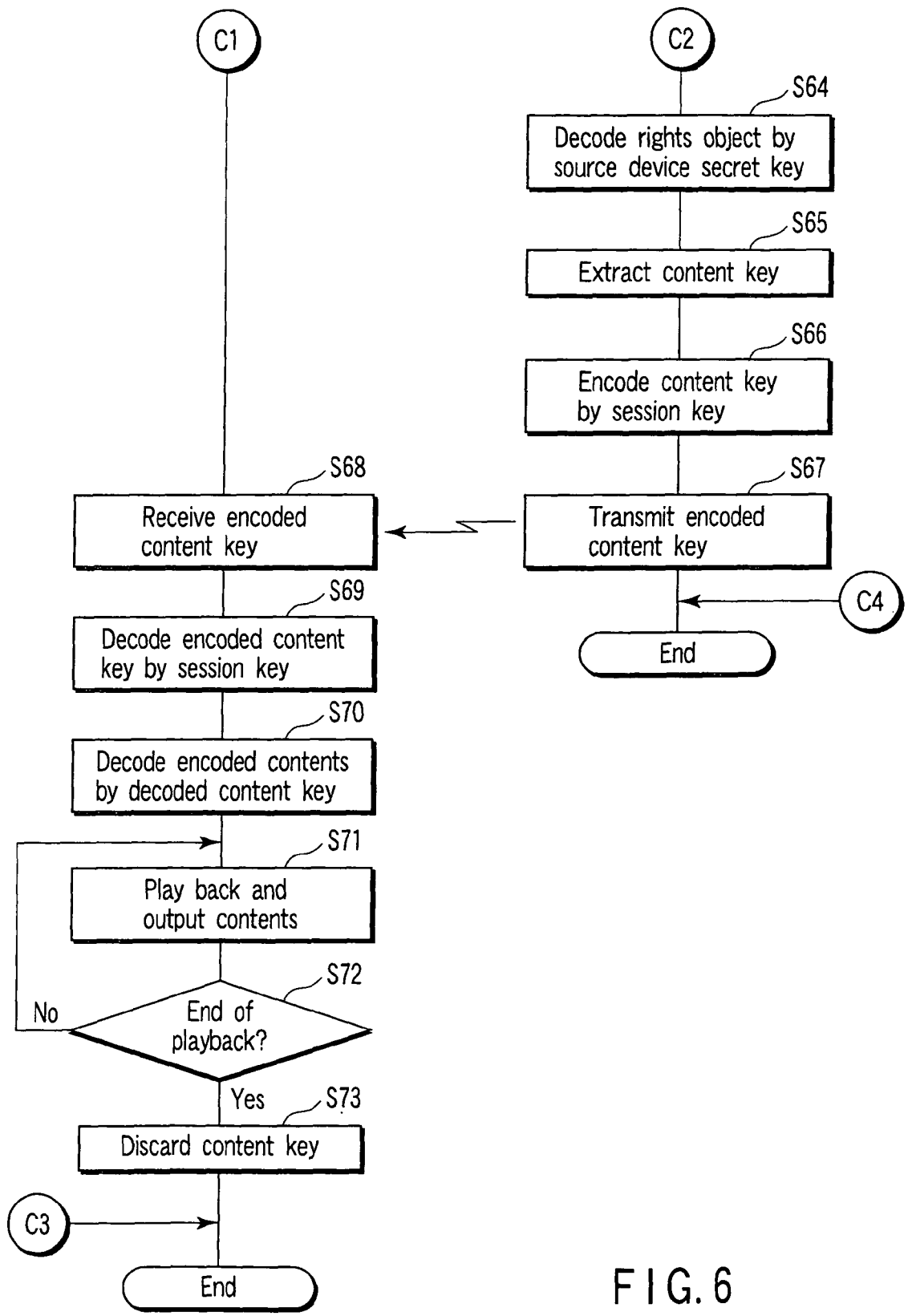
FIG. 6 is a flow chart showing a latter-half portion of procedures for, and content of, content playback control by the source device shown in FIG. 2 and the rendering device shown in FIG. 3.

FIG. 4 is a sequence diagram showing an operation of the system, and FIGS. 5 and 6 are flow charts each showing control procedures for, and content of, the source device SDa and the rendering device RDa.

(1) Downloading Content

If a user makes an operation of downloading content in a source device SDa, the source device SDa moves from step S51 to step S52 as shown in FIG. 5. Then, an access is provided to a content server CSV. In step S53, desired encoded content EC are downloaded as shown in FIG. 4(1) from the content server CSV, and the downloaded encoded content EC are stored in the content memory 13. Subsequently, the source device SDa provides an access to a rights server RSV in step S54, and downloads a rights object RO that corresponds to the received encoded content from the rights server RSV in step S55, as shown in FIG. 4(2). Then, the downloaded rights object RO is stored in the content memory 13 so as to be associated with the encoded content.

On the other hand, assume that, in the rendering device RDa, the user has made an operation of requesting sharing of encoded content stored in the source device SDa. Then, the rendering device RDa moves the processing from step S56 to step S57 as shown in FIG. 5. In step S57, an access is provided to the content server CSV, and in step S58, encoded content EC targeted to be shared are downloaded from the content server CSV, as shown in FIG. 4(3). Then, the downloaded encoded content EC are stored in the content memory 23.

(2) Transferring Content Key

In the case of playing back shared content, first, the rendering device RDa is connected to the source device SDa via the signal cable CB. Then, the rendering device RDa makes an operation of playing back the downloaded content targeted to be shared.

Then, the rendering device RDa moves the processing from step S59 to step S60, in which a request for playing back shared content is transmitted to the source device SDa via the signal cable CB. In response to this request, the source device SDa receives the playing back request in step S61. When the source device SDa has received the playing back request, the source device SDa and the rendering device RDa establish a secure session, as shown in FIG. 4(4), in accordance with step S63 and step S62.

An operation of playing back content targeted to be shared may be made from the source device SDa. In this case, although not shown, the playing back request is transmitted from the source device SDa to the rendering device RDa. When the rendering device RDa has received the playing back request, the source device SDa and the rendering device RDa establish a secure session, as shown in FIG. 4(4), in accordance with step S63 and step S62.

In a secure session, mutual authentication is carried out between the source device SDa and the rendering device RDa. Only in the case where the validity of the rendering device RDa and the source device SDa has been authenticated is a session established. In addition, as a result of the mutual authentication, a common session key Sk is generated in the source device SDa and the rendering device RDa. The session key Sk is generated by random numbers exchanged with each other during mutual authentication.

Next, the source device SDa reads out the rights object RO that corresponds to the content targeted to be shared from the content memory 13 in step S64, as shown in FIG. 6. Then, the rights object RO is decoded by the source device secret key that is secretly held. Next, in step S65, a content key Kc is extracted from the decoded rights object RO, and the content key Kc is encoded in step S66 by the session key Sk generated in the secure session.

An AES (Advanced Encryption Standard) or the like defined by the US Commerce Department Standardization Bureau (NIST) is employed as an encoding system, and an AES key wrapping algorithm (AES_WRAP) or the like specified by an IETF standard RFC (REQUEST FOR COMMENT) 3394 is employed as a mode for encoding a content key Kc. By using the above encoding technique, the content key Kc can be transferred while secrecy and validity are maintained.

Then, the source device SDa transmits the encoded content key EKc to the rendering device RDa via the signal cable CB, as shown in FIG. 4(5), in accordance with step S67. In addition, at a time point of the transmission, the source device SDa eliminates the session key Sk.

In contrast, the rendering device RDa receives the encoded content key EKc transferred from the source device SDa in step S68. Subsequently, the rendering device RDa decodes the received encoded content key EKc by the session key Sk in step S69, and temporarily stores the decoded content key Kc. In addition, the rendering device RDa eliminates the stored session key Sk at a time point of temporarily storing the content key Kc.

In the case where playback limitation information of a target rights object RO includes a count limit, the source device SDa makes a change of that state. For example, assume that the object RO has been downloaded from the rights server RSV while up to three playbacks are specified as a playback count. Of course, while a processing of decrementing its playback count limit is carried out in playback in the source device SDa itself, the processing of decrementing its playback count limit is also carried out in the same manner as that in playback in the source device SDa itself at a time point at which the source device SDa has sent out the encoded content key EKc to the rendering device RDa.

As another embodiment, instead of carrying out a processing of decrementing its playback count limit at a time point at which the source device SDa has sent out the encoded content key EKc to the rendering device RDa, a processing may be carried out for decrementing a playback count limit at a time point of the receipt of notification of playback start or playback completion from the rendering device RDa.

(3) Playing Back Shared Content in Rendering Device RDa

The rendering device RDa reads out encoded content EC targeted for playback from the content memory 23 in step S70, and decodes the read-out encoded content EC by the decoded content key Kc. Then, content C obtained by this decoding are decoded in step S71, and the decoded content are played back and output as shown in FIG. 4(6). For example, if content are music content, such music content are decoded by an audio decoder to be loudly outputted from the speaker 28 by the input/output interface 26. In contrast, if content are video content, such video content are decoded by a video decoder, and then, the decoded content are displayed on the display device 29 by the input/output interface 26.

When the content playback is started, the rendering device RDa monitors the end of playback of content in step S72. When playback terminates, the processing moves to step S73 in which the content key Kc used for decoding the encoded content EC is discarded. In the case of playing back the content C again, a secure session is established as described in items (2) and (3) above, the content key Kc is securely transferred again from the source device SDa, and encoded content EC are decoded by the securely transferred content key Kc, thereby enabling playback of the content again. In this manner, in the rendering device RDa, one-time playback of shared content can be carried out in a state in which connection to the source device SDa is established.

In the above description, a secure session has been established every time the encoded content key EKc is transferred. However, such a secure session may exist in the source device SDa and the rendering device RDa for a predetermined period, and while such a session exists, there may be eliminated a need for newly establishing a secure session.

Further, the following configuration, for example, is considered as means for reliably discarding the content key Kc. That is, the rendering device RDa can store only one content key. When playback of the encoded content terminates in the rendering device RDa, and information indicating the fact is notified to the source device SDa, the source device SDa transfers an invalid key to the rendering device RDa. The rendering device RDa forcibly rewrites a stored content key into the received invalid key upon the receipt of the invalid key.

As another means, it is considered that information representing a playback count or a playback period is added to a content key to be transferred, and when the content playback count or playback period exceeds a specified value of the playback count or playback period added to the content key in the rendering device RDa, the content key is erased.

As has been described above, in the first embodiment, the content key Kc is transferred from the source device SDa to the rendering device RDa via a secure session for every playback in the case where the content owned by the source device SDa are shared and played back in the rendering device RDa. Then, the encoded content EC are decoded, played back, and outputted by using the transferred content key Kc, and the content key Kc is discarded after the end of playback.

Therefore, with the rendering device RDa connected to the source device SDa, content can be played back only once every time a content key transferred. Thus, it becomes possible to share and play back content in a plurality of devices while rights are reliably protected. In addition, the present invention is effective for domain extension. Further, a content key is transferred from the source device SDa to the rendering device RDa by using a common key system with a session key, thus making it possible to share a content key in accordance with a comparatively light processing.

Second Embodiment

According to a second embodiment of the present invention, a content key is transferred from a source device to a rendering device by using a public key encoding system.

Figure 7:
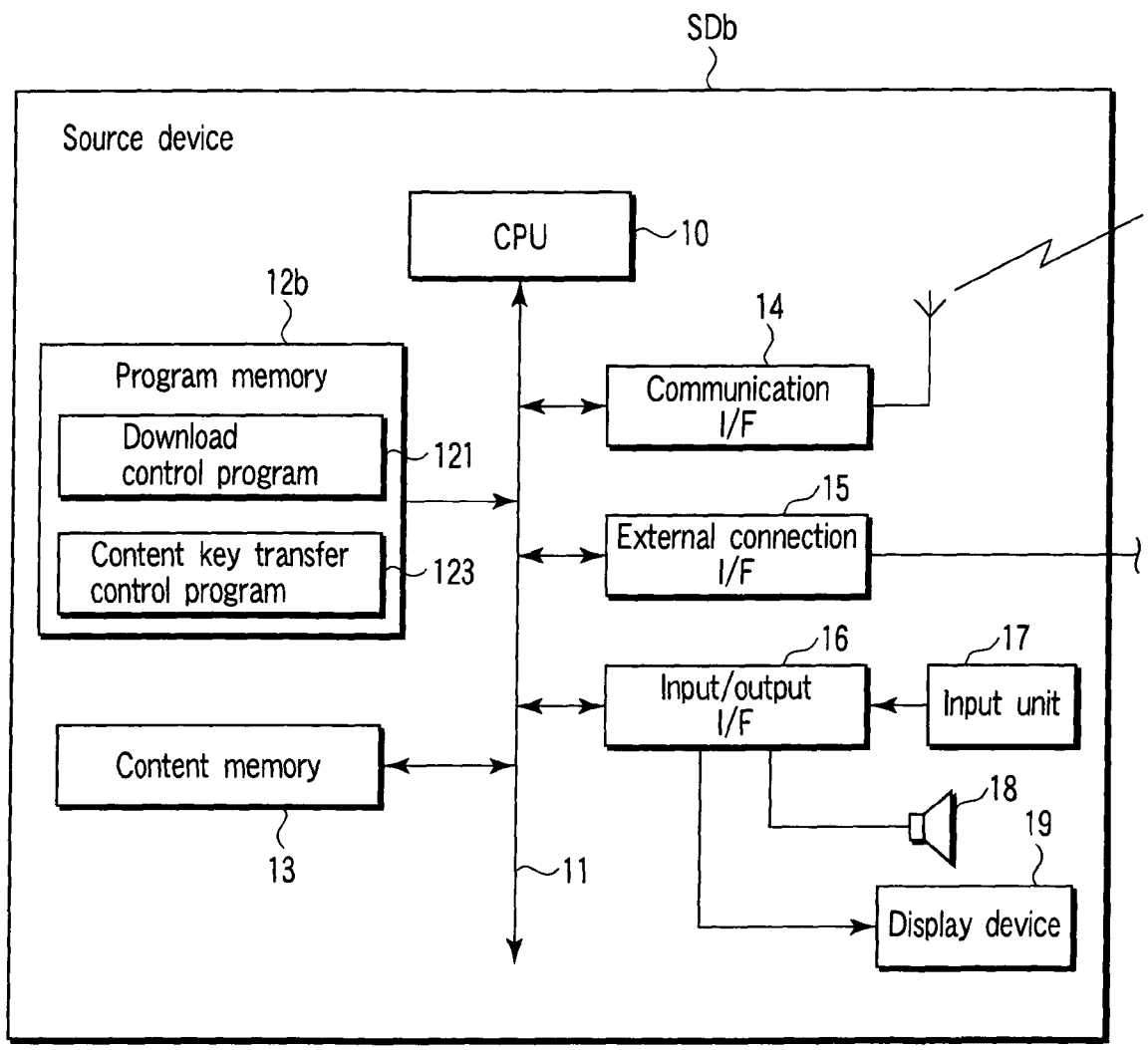
FIG. 7 is a block diagram depicting a configuration of a source device for use in a content playing back system according to a second embodiment of the present invention.
Figure 8:
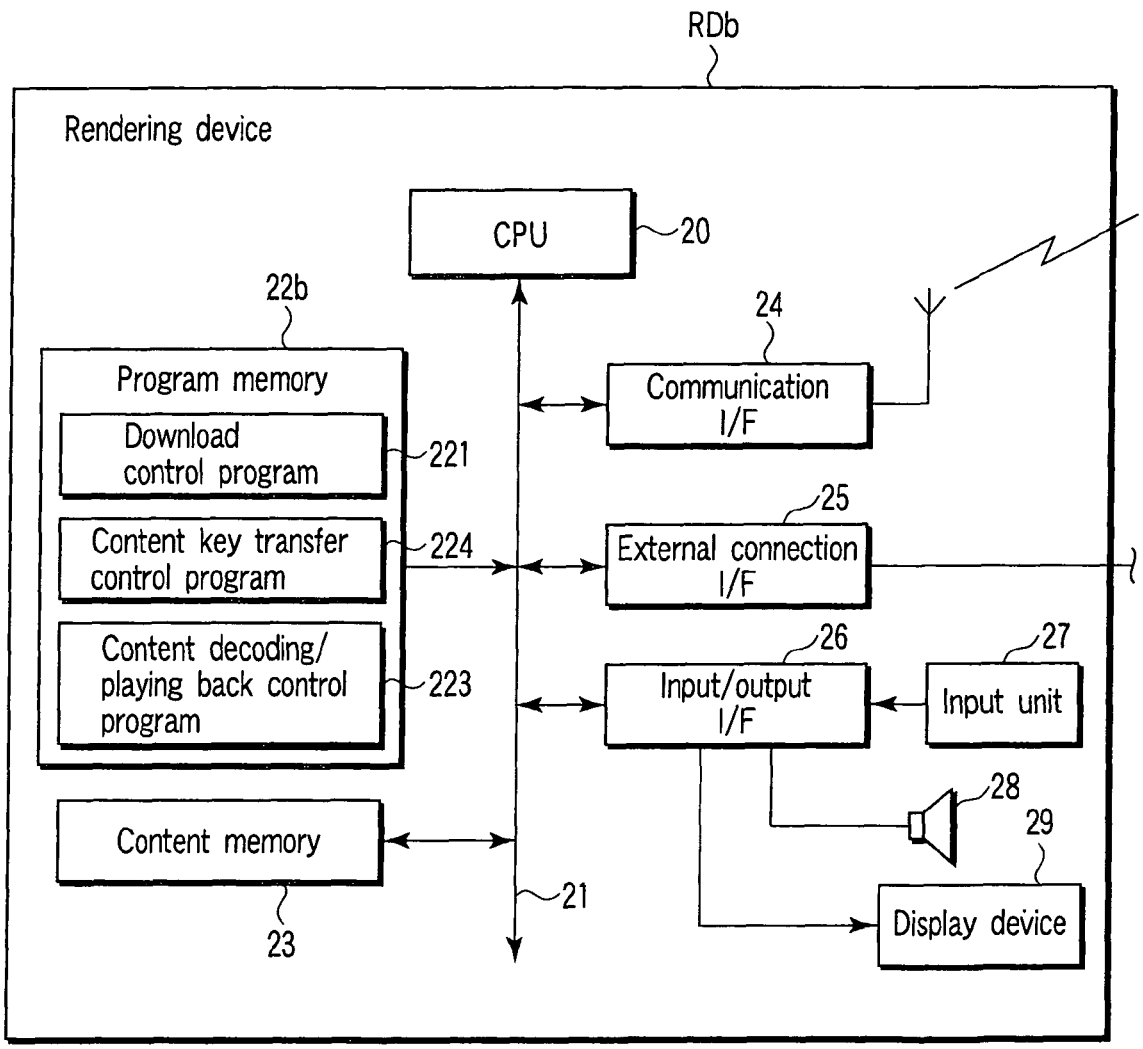
FIG. 8 is a block diagram depicting a configuration of a rendering device for use in the content playing back system according to the second embodiment of the invention.

FIGS. 7 and 8 are block diagrams depicting configurations of a source device SDb and a rendering device RDb that configure a content playing back system according to the second embodiment of the invention, respectively. In the present embodiment, the rendering device RDb holds a public key pair of a secret key for transferring a content key Kc and a public key with a certificate. In FIGS. 7 and 8, like constituent elements shown in FIGS. 2 and 3 are designated by like reference numerals, and a detailed description is omitted here.

First, a program memory 12b of the source device SDb newly stores a content key transfer control program 123. The content key transfer control program 123 causes the CPU 10 to execute the following processing. That is, first, a public key with a certificate is received from the rendering device RDb. At the time of transfer of the content key Kc, the validity of the certificate is checked in a rights server RSV, and then, the content key Kc is encoded by the public key to be transferred to the rendering device RDb.

On the other hand, a content key transfer control program 224 is stored in a program memory 22b of the rendering device RDb. The content key transfer control program 224 causes the CPU 10 to execute the following processing. That is, first, a rendering device public key and a rendering device secret key paired with this public key are acquired from the rights server RSV. The public key is then notified to the source device SDb. Subsequently, in the case where the content key encoded by the public key has been transferred from the source device SDb, the transferred encoded content key is decoded by using the rendering device secret key.

Now, an operation of playing back content by the above configured system will be described here.

Figure 9:
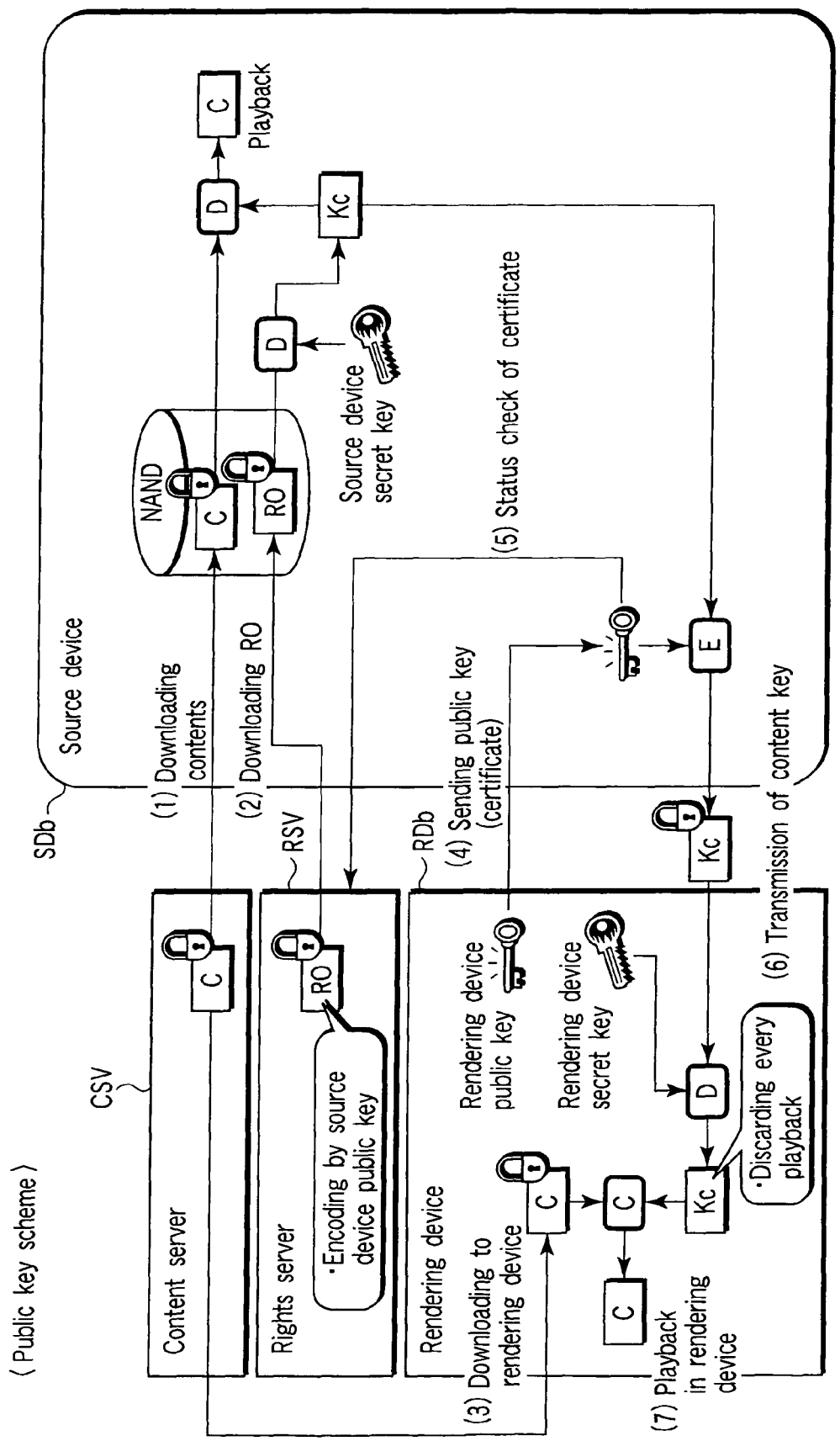
FIG. 9 is a sequence diagram for explaining a content playing back operation in the content playing back system according to the second embodiment of the invention.
Figure 10:
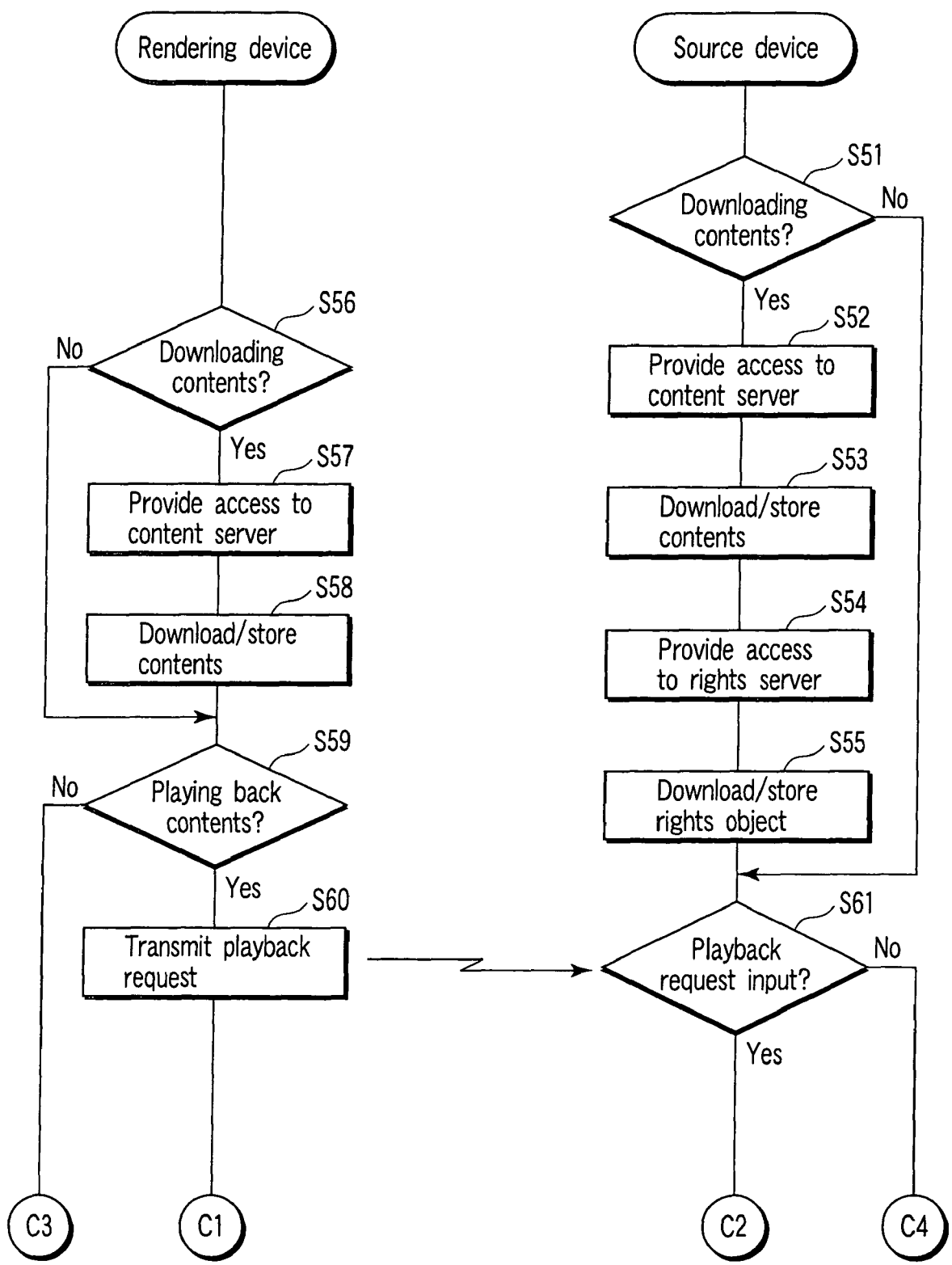
FIG. 10 is a flow chart showing a first-half portion of procedures for, and content of, content playback control by the source device shown in FIG. 7 and the rendering device shown in FIG. 8.
Figure 11:
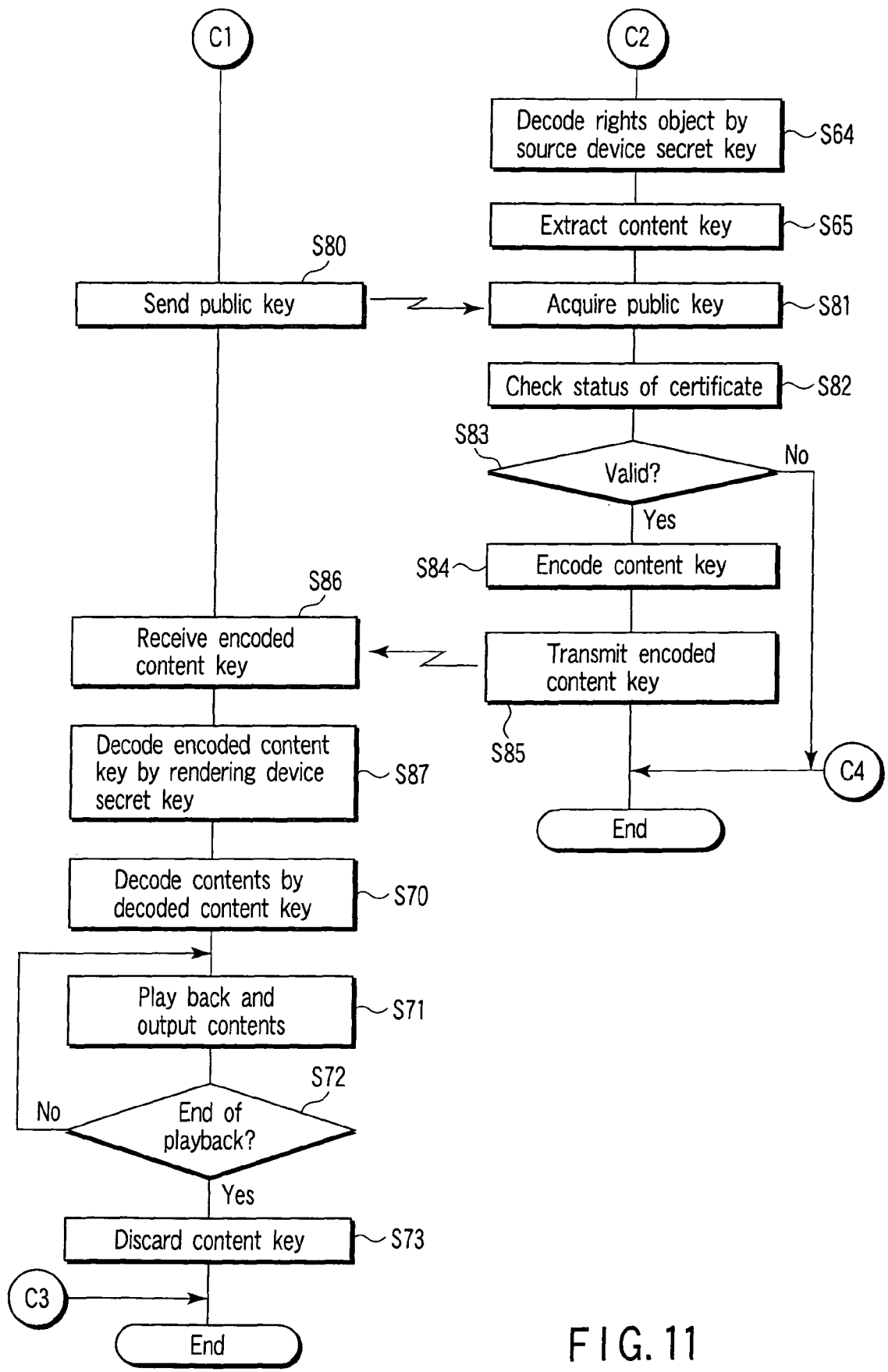
FIG. 11 is a flow chart showing a latter-half portion of procedures for, and content of, content playback control by the source device shown in FIG. 7 and the rendering device shown in FIG. 8.

FIG. 9 is a sequence diagram showing an operation of the system, and FIGS. 10 and 11 are flow charts showing control procedures for, and content of, the source device SDb and the rendering device RDb. In FIGS. 10 and 11, like constituent elements shown in FIGS. 5 and 6 are designated by like reference numerals.

(1) Downloading Content

When a user makes an operation of downloading content in a source device SDa, the source device SDb moves the processing from step S51 to step S52, as shown in FIG. 10. Then, an access is provided to a content server CSV. In step S53, desired encoded content EC are downloaded from the content server CSV as shown in FIG. 9(1), and the downloaded encoded content EC are stored in the content memory 13. Subsequently, the source device SDb provides an access to a rights server RSV in step S54; downloads a rights object RO that corresponds to the received encoded content from the rights server RSV in step S55 as shown in FIG. 9(2); and stores the downloaded rights object RO in the content memory 13 so as to be associated with the encoded content.

On the other hand, when in the rendering device RDb, a user makes an operation of requesting sharing of encoded content stored in the source device SDb, the rendering device RDb moves the processing from step S56 to step S57 as shown in FIG. 10. Then, an access is provided to the content server CSV in the step S57. Encoded content EC targeted to be shared are downloaded from the content server CSV as shown in FIG. 9(3) in step S57, and the downloaded encoded content EC are stored in the content memory 13.

(2) Transferring Content Key

In the case of playing back shared content, the rendering device RDb is first connected to the source device SDb via the signal cable CB. In the rendering device RDb, an operation of playing back the downloaded content targeted to be shared is made. By doing so, the rendering device RDb moves the processing from step S59 to step S60 in which a request for playing back shared content is transmitted to the source device SDb via the signal cable CB. In addition, in step S80 shown in FIG. 11, a rendering device public key (with a certificate) acquired in advance is sent to the source device SDb as shown in FIG. 9(4).

In contrast, the source device SDb receives the playing back request in step S61. When this playing back request is received, a rights object RO corresponding to the content targeted to be shared is first read out from the content memory 13 in step S64, as shown in FIG. 11. Then, the rights object RO is decoded by a source device secret key, and from the decoded rights object RO, a content key Kc is extracted in step S65.

The operation of playing back content targeted to be shared may be made from the source device SDb. In this case, a sequence is carried out as follows, although not shown.

That is, first, the playback request is transmitted from the source device SDb to the rendering device RDb. When the rendering device RDb receives the playing back request, a rendering device public key (with a certificate) is sent to the source device SDb. In contract, the source device SDb reads out the rights object RO that corresponds to the content targeted to be shared from the content memory 13 in step S64, as shown in FIG. 11, and decodes the rights object RO by the source device secret key. In step S65, a content key Kc is extracted from the decoded rights object RO.

Subsequently, the source device SDb receives the rendering device public key sent from the rendering device RDb in step S81. Then, in step S82, an access is provided to the rights server RSV as shown in FIG. 9(5), and a status check is made for the certificate attached to the received public key. When the validity of the certificate has been verified by this status check, the processing moves from step S83 to step S84 in which the content key Kc is encoded by the public key. At this time, a public key encoding system using an RSA encode key or the like is used as an encoding system. The encoded content key EKc is transmitted to the rendering device RDb as shown in FIG. 9(6) in S85. Thereafter, at a time point of transmission, the source device SDb deletes the rendering device public key.

In contrast, in step S86, the rendering device Rdb receives the encoded content key EKc transmitted from the source device SDb. In step S87, the rendering device RDb decodes the received encoded content key EKc by the rendering device secret key, and temporarily stores the content key Kc obtained by this decoding.

In the case where a count limit is included in playback limit information of a targeted rights object RO, the source device SDb carries out a processing of changing that state. For example, assume that the rights object RO has been downloaded from the rights server RSV after up to three playbacks have been specified as a playback count. Of course, while a processing of decrementing the playback count limit in playback by the source device SDb itself is made, the processing of decrementing the playback count limit is also made in the same manner as the playback by the source device SDb described previously at a time point at which the source device SDb has been sent out the encoded content key EKc to the rendering device RDb.

As another embodiment, the processing of decrementing the playback count limit may be made at a time point at which the notification of playback start or playback completion has been received from the rendering device RDb, instead of carrying out the processing of decrementing the playback count limit at a time point at which the source device SDa has sent out the encoded content key EKc to the rendering device RDb.

(3) Playing Back Shared Content in Rendering Device RDb

Next, in step S70, the rendering device RDb reads out encoded content EC targeted for playback from the content memory 13, and decodes the read-out encoded content EC by the decoded content key Kc. Then, content C obtained by this decoding are decoded in step S71, and the decoded content are played back to be outputted by the speaker 18 or the display device 19, as shown in FIG. 9(7).

When the content playback starts, the rendering device RDb monitors the end of playback of content in step S72. When playback terminates, the processing moves to step S73 in which the content key Kc used for a processing of decoding encoded content EC is discarded. As means for discarding the content key Kc, as described in the first embodiment, there can be applied: means for transferring an invalid key from the source device SDb, and forcibly rewriting a content key being stored in the rendering device RDb; and means for adding information representing a playback count or a playback period to a content key, and erasing the content key at a time point at which, in the rendering device RDb, the playback count or playback period of content has exceeded a specified value of the playback count or playback period added to the content key.

In the case of playing back the content C again, as described in items (2) and (3) above, the content key Kc is securely transferred again from the source device SDb, and the encoded content EC are decoded by the securely transferred content key Kc, thereby enabling such playback again. In this manner, with the rendering device RDb connected to the source device SDb, one-time playback of shared content is enabled.

As described above, in the second embodiment, every time shared content are played back, the content key Kc is transferred from the source device SDb to the rendering device RDb by using a public key encoding system. Then, encoded content EC are decoded, played back, and outputted by using the transferred content key Kc so as to discard the content key Kc after the end of playback.

Therefore, as in the first embodiment, content can be played back only once every time a content key is transferred with the rendering device RDb connected to the source device SDb. For this reason, it becomes possible to share and play back content in a plurality of devices while rights are reliably protected.

Thin embodiment has shown that a rendering device public key is transferred in order to establish a secure session every time the encoded content key EKc is transferred. However, in another embodiment, secure sessions exist in the source device SDa and the rendering device RDa for a predetermined period, and while the sessions exist, there may be no need for newly establishing a secure session.

Further, in the second embodiment, a rendering device public key with a certificate is sent to the source device SDb. For this reason, in the source device SDb, it becomes possible to make a revocation check of the rendering device RDb, i.e., to eliminate leak of content or leak of confidential information and an invalid device for making another breach of trust operation for a content holder.

Third Embodiment

A third embodiment of the present invention further improves the second embodiment. Between a source device and a rendering device, a source device public key and a rendering device public key are exchanged and stored in advance. As a consequence, it is possible to play back shared content by only the rendering device registered in advance, and to make revocation checks of both the source device and the rendering device.

Figure 12:
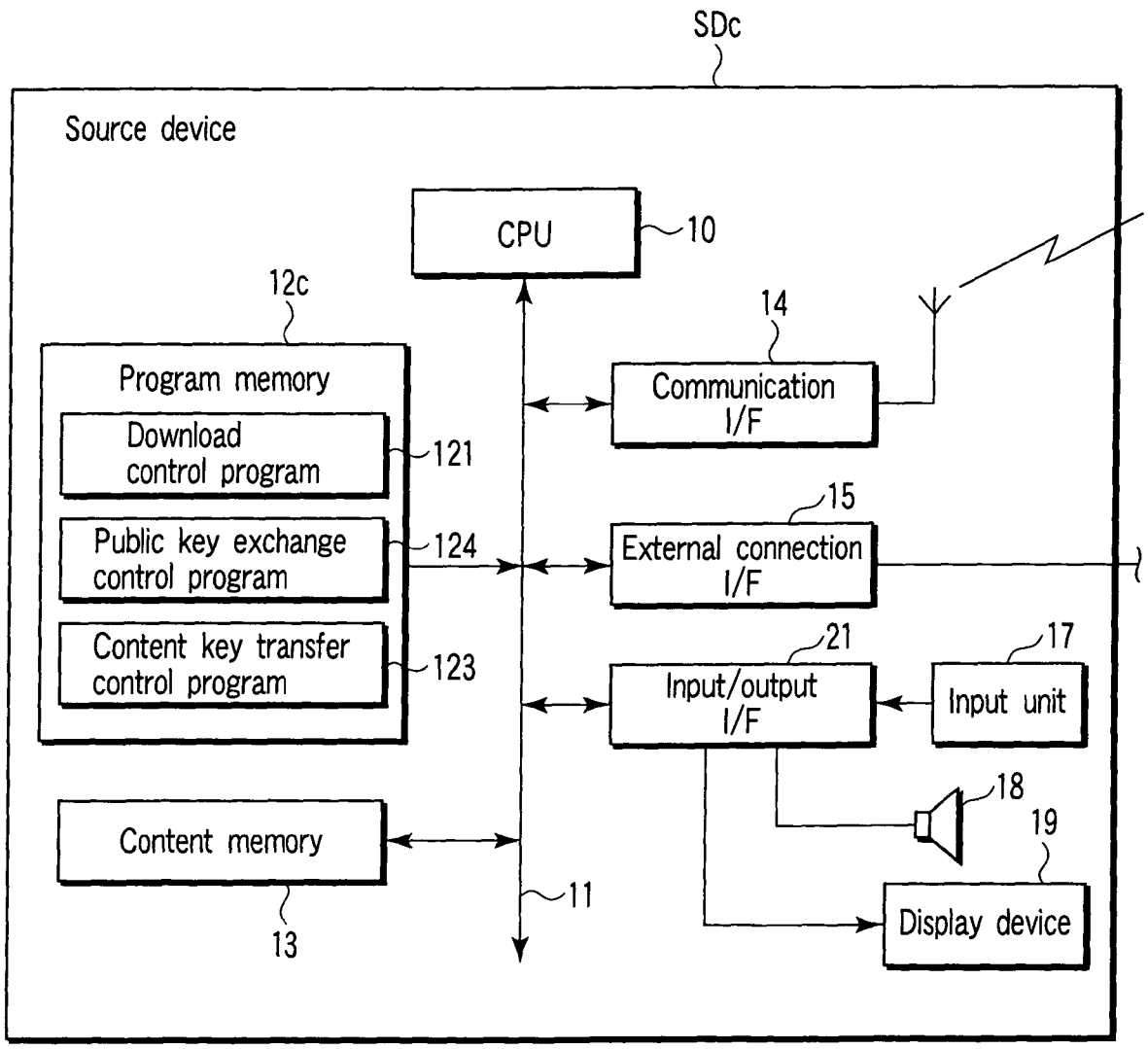
FIG. 12 is a block diagram depicting a configuration of a source device for use in a content playing back system according to a third embodiment of the present invention.
Figure 13:
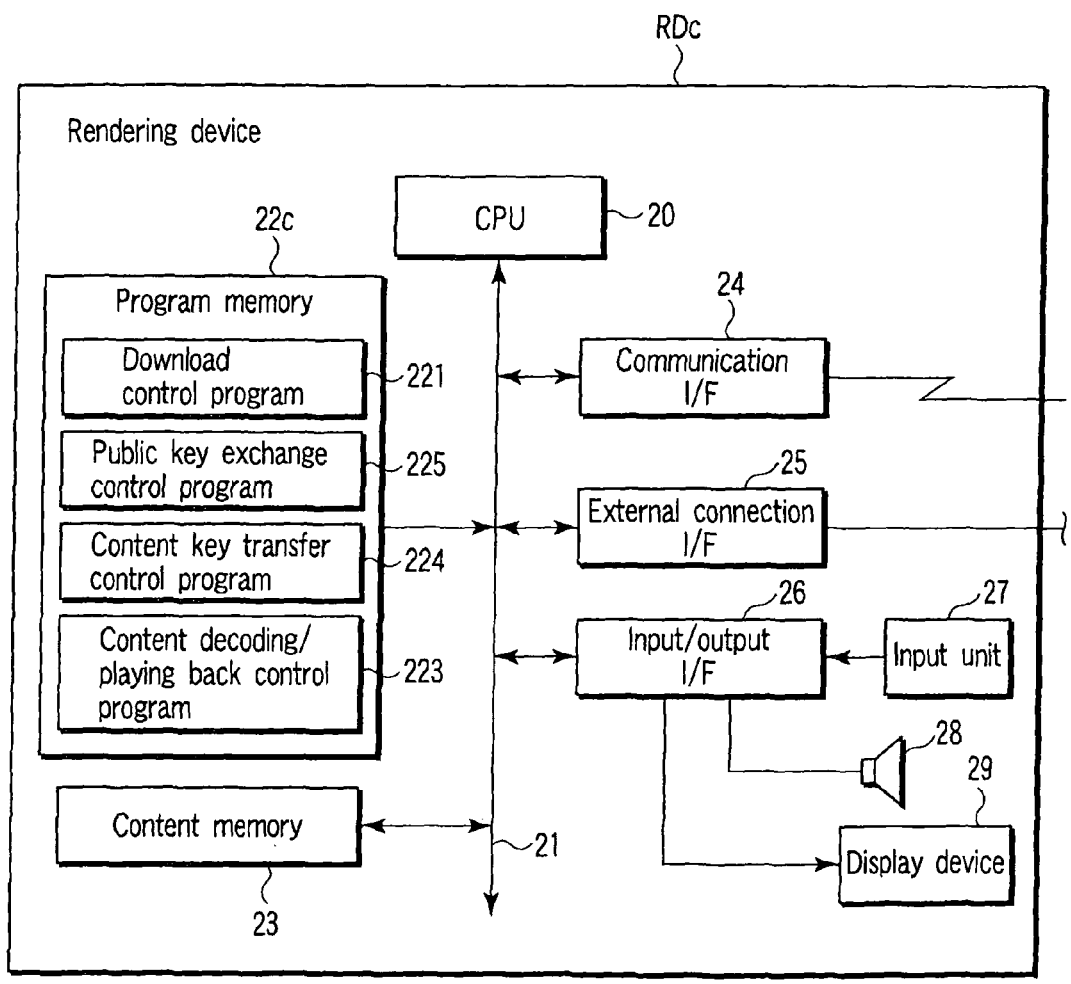
FIG. 13 is a block diagram depicting a configuration of a rendering device for use in the content playing back system according to the third embodiment of the invention.

FIGS. 12 and 13 are block diagrams depicting configurations of a source device SDc and a rendering device RDc that configure a content playing back system according to the third embodiment of the invention, respectively. In FIGS. 12 and 13, like constituent elements shown in FIGS. 2 and 3 are designated by like reference numerals, and a detailed description is omitted here.

The source device SDc has: a public key pair composed of a secret key and a public key with a certificate, for receiving distribution of content; and a public key pair composed of a secret key and a public key with a certificate, for exchanging the content key Kc with the rendering device. Namely, these keys may be the same key pair. In addition, the rendering device RDc has a public key pair composed of a secret key and a public key with a certificate, for exchanging the content key Kc.

A public key exchange control program 124 is stored in a program memory 12c of the source device SDc. The public key exchange control program 124 causes the CPU 10 to execute the following processing. That is, prior to playback of content, a source device public key with a certificate and a rendering device public key with a certificate are exchanged with the rendering device RDc via the signal cable CB.

On the other hand, a public key exchange control program 225 is stored in a program memory 22c of the rendering device RDc as well. The public key exchange control program 225 causes the CPU 20 to execute the following processing. That is, prior to playback of content, a source device public key with a certificate and a rendering device public key with a certificate are exchanged with the source device SDc via the signal cable CB.

Now, a description will be given with respect to an operation of playing back content by using the system configured as described above.

Figure 15:
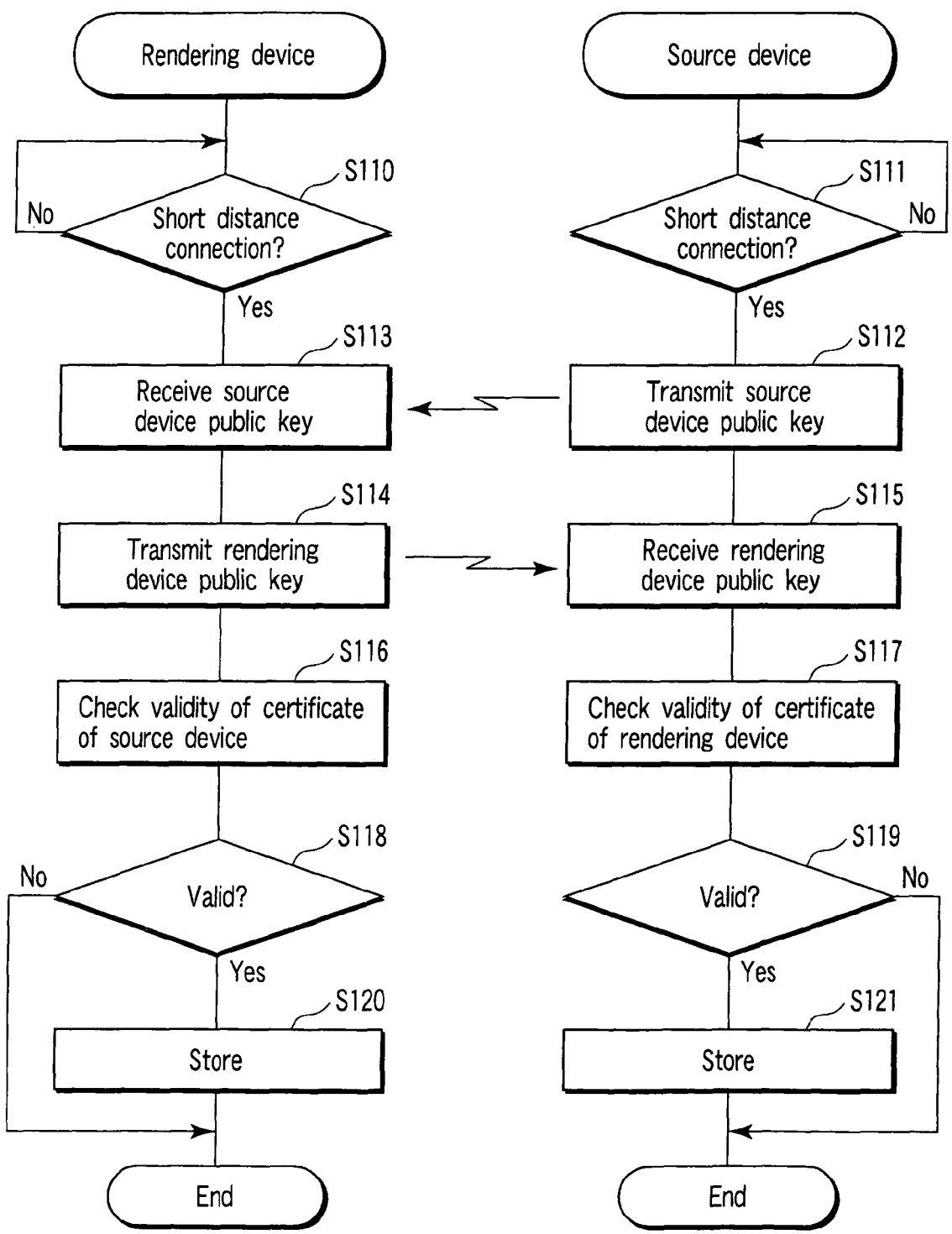
FIG. 15 is a flow chart showing procedures for, and content of, a pre-registration processing by the source device shown in FIG. 12 and the rendering system shown in FIG. 13.
Figure 16:
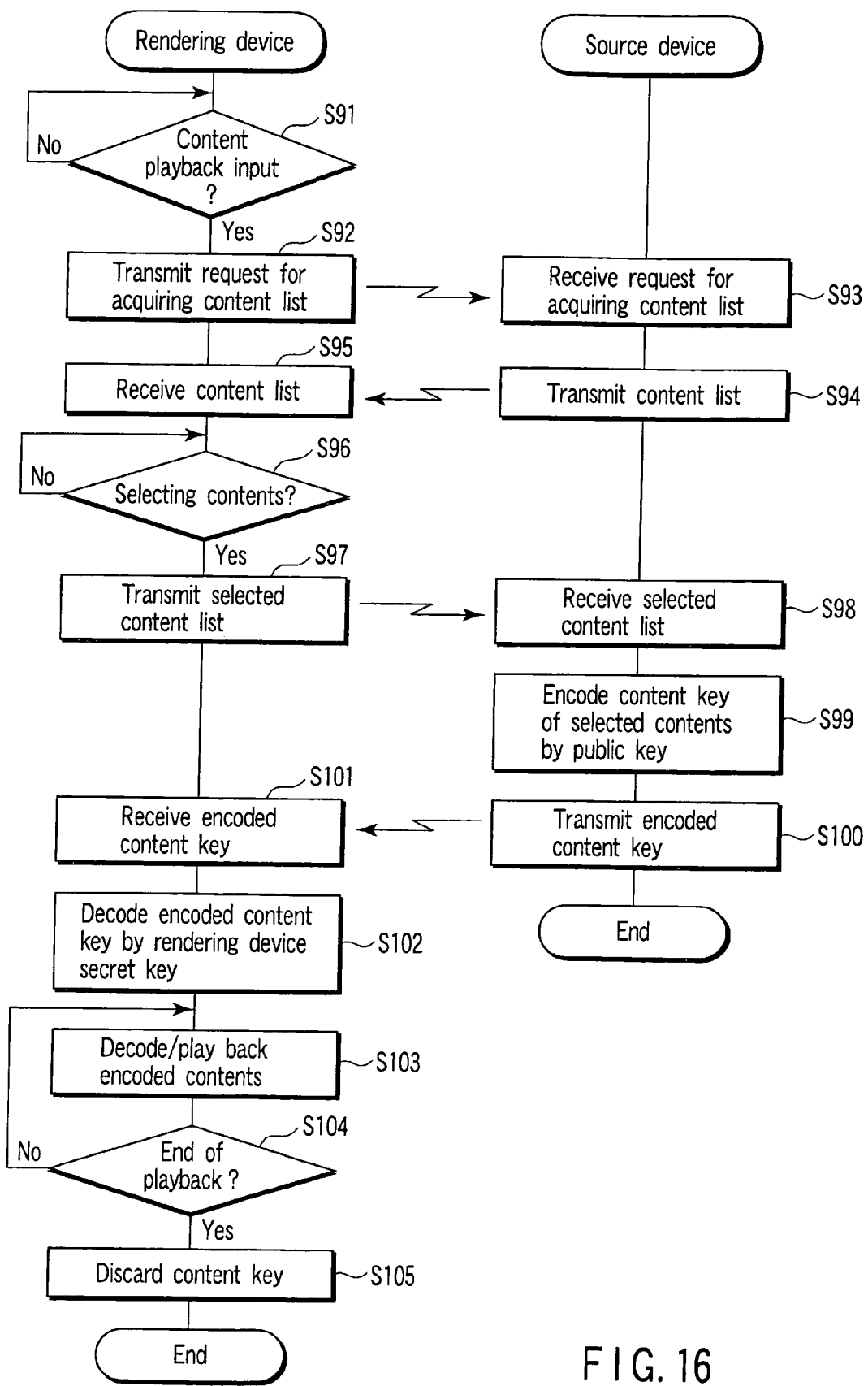
FIG. 16 is a flow chart showing procedures for, and content of, content playback control by the source device shown in FIG. 12 and the rendering device shown in FIG. 8.

FIG. 14 is a sequence diagram showing the operation of the system, and FIGS. 15 and 16 are flow charts showing control procedures for, and content of, the source device SDc and the rendering device RDc.

(1) Registering Public Key in Advance

In the case of registering a public key in advance, a user starts up a register mode in, for example, a source device SDc after connection has been made between the source device SDc and a rendering device RDc via a signal cable CB. Then, as shown in FIG. 15, the source device SDc determined whether or not a state of connection with the rendering device RDc exists in a mutually visible range, namely, whether or not a short distance connection is made. When a short distance connection is made, a register mode startup command is transmitted to the rendering device RDc. Then, in the step S112, a source device public key (with a certificate) acquired in advance from the rights server RSV is transferred to the rendering device RDc via the signal cable CB.

On the other hand, upon the receipt of the register mode startup command from the source device SDc, the rendering device RDc itself starts up a register mode. In step S110, it is determined whether or not a state of connection with the source device SDc is in a short distance connection. Then, in the case of a short distance connection using a USB cable or the like, the source device public key (with a certificate) transferred from the source device SDc is received in step S113.

A register mode startup operation may be made in the rendering device RDc instead of the source device SDc. In addition, it is not always necessary to make determination of whether or not a short distance connection is made by both the source device SDc and the rendering device RDc. This determination by either one of them may be made.

Upon the receipt of the source device public key (with a certificate), the rendering device RDc transfers, in step S114, the rendering device public key (with a certificate) acquired in advance from the rights server RSV to the source device SDc via the signal cable CB. In step S116, the content of a certificate attached to the source device public key received previously are inquired to the rights server RSV, thereby making a status check for the source device public key. When the validity of the source device public key is checked as a result of the determination, the processing moves from step S118 to step S120 in which the source device public key is stored.

On the other hand, the source device SDc also inquires to the rights server RSV the content of a certificate attached to the rendering device public key received previously, thereby making a status check for the rendering device public key. When the validity of the source device public key is checked as a result of the determination, the processing moves from step S118 to step S120 in which the rendering device public key is stored.

(2) Playing Back Content in Rendering Device RDc

Assume that the content memory 13 of the source device SDc has already stored encoded content and its rights object downloaded from the content server CSV and the rights server RSV.

When the user inputs a request for playing back content in the rendering device RDc, the rendering device RDc moves the processing from step S91 to step S92 as shown in FIG. 16, in which a request for acquiring a content list is first sent to the source device SDc, as shown in FIG. 14(1). In response to this request, upon the receipt of the request for acquiring the content list in step S93, the source device SDc produces a content list in step S94, and transmits the content list to the rendering device RDc, as shown in FIG. 14(2). The rendering device RDc receives the content list in step S95, and displays the received content on the display device 29. The rendering device RDc acquires in advance the information corresponding to the content list of the source device SDc, whereby the step of acquiring the content list may be eliminated.

Assume that, in this state, the user has selected content targeted for playback from among the displayed content list. In this case, the rendering device RDc moves the processing from step S96 to step S97 in which a list of the selected content is produced to be transmitted to the source device SDc, as shown in FIG. 14(3).

In response to this transmission, upon the receipt of the list of the selected content in step S98, the source device SDc reads out the rights object RO corresponding to the selected content from the content memory 13, and decodes the rights object RO by a source device secret key. Then, a content key is extracted from the decoded rights object RO.

Subsequently, in step S99, the source device SDc encodes the extracted content key by the rendering device public key registered in advance, as shown in FIG. 14(4). The decoding used here, for example, may be a public key encoding system by RSA encoding or the like. Then, the encoded content key is transmitted to the rendering device RDc in step S100, as shown in FIG. 14(5).

In the present embodiment, there is no need for the source device SDc and the rendering device RDc to be connected to each other via the signal cable CB. These devices may be connected to each other via the communication network NW. This is because, when public keys are exchanged with each other, the devices have made a registration work in proximity.

In addition, the source device SDc may check the validity of the rendering device public key of the rendering device RDc for the rights server RSV. This is because a rendering device public key may be lost, in effect, after registering the rendering device public key.

On the other hand, the rendering device RDc receives the encoded content key transmitted from the source device SDc in step S101. Here, the rendering device RDc may check the validity of the source device public key of the source device SDc for the rights server RSV. This is because the source device public key may be lost, in effect, after registering the source device public key.

Then, the received encoded content key is decoded by the rendering device public key in the step S102, as shown in FIG. 14(6). Subsequently, the rendering device RDc reads out encoded content targeted for playback from the content memory 13 in step S103, and decodes the read-out encoded content by the decoded content key. The content obtained by this decoding are decoded, and then, as shown in FIG. 14 (7), the decoded content are played back and outputted by the speaker 18 or the display device 19.

When the content playback starts, the rendering device RDc monitors the end of playback of content in step S104. When playback terminates, the processing moves to step S105 in which a content key used for a processing of decoding encoded content is discarded. As means for discarding the content key, as has been described in the first embodiment, there can be applied: means for transferring an invalid key from the source device SDb, and forcibly rewriting a content key being stored in the rendering device RDb; or means for adding information representing a playback count or a playback period to a content key, and erasing the content key at a time point at which, in the rendering device RDb, the playback count or playback period of content has exceeded a specified value of the playback count or playback period added to the content key.

In the case where playback limitation information of a target rights object RO includes a count limit, the source device SDc makes a change of that state. For example, assume that the object TO has been downloaded from the rights server RSV while up to three playbacks are specified as a playback count. Of course, while a processing of decrementing its playback count limit is carried out in playback in the source device SDc itself, the processing of decrementing its playback count limit is carried out in the same manner as that in playback in the source device SDc itself at a time point at which the source device SDc has sent out the encoded content key EKc to the rendering device RDc.

As another embodiment, a processing may be carried out for decrementing a playback count limit at a time point of the receipt of notification of playback start or playback completion from the rendering device RDc, instead of carrying out a processing of decrementing its playback count limit at a time point at which the source device SDa has sent out the encoded content key EKc to the rendering device RDc.

As has been described above, in the third embodiment, the source device public key and the rendering device public key are exchanged between the source device and the rendering device and stored in advance. At the time of playing back shared content in the rendering device RDc, the content key corresponding to the content targeted for playback in the source device SDc is encoded by the rendering device public key to be transferred to the rendering device RDc. The transferred encoded content key is decoded by the rendering device secret key so as to decode, play back, and output the content by using the decoded content key.

Therefore, as in the first and second embodiments, content can be played back only once in a plurality of devices every time a content key is transferred. This makes it possible to share and play back content in a plurality of devices while rights are reliably protected. Moreover, it becomes possible to play back shared content only in the rendering device RDc having registered a device public key in advance, whereby a rights sharing destination can be limited further rigidly. In addition, by exchanging the public keys, it becomes possible to make a revocation check of both the source device SDc and the rendering device RDc, i.e., to eliminate leak of content or leak of confidential information and an invalid device for making another breach of trust operation for a content holder.

Other Embodiment

In the foregoing embodiments, content and rights objects that have been already encoded are downloaded from a content server CSV and a rights server RSV to be stored. However, content and rights information before encoded are downloaded, whereby these items of information may be encoded in a source device.

In the foregoing embodiments, a connection is made between a source device and a rendering device via a signal cable CB such as a USB cable so as to transfer an encoded content key or the like via the signal cable CB. However, the invention is not limited thereto. A connection may be made between the source device and the rendering device by using an IrDA or IEEE1394 interface using infrared rays or a wireless interface with a communication distance of 10 m so as to make communication.

Further, various modifications can occur without departing from the spirit of the invention also with respect to type and configuration of the source device and rendering device, and a key information encoding system and transfer control procedures for transferring key information from the source device to the rendering device.

Meanwhile, the foregoing embodiment explains the case of playing back audio contents and video contents granted with rights. However, this invention may also be applied in the case of executing game contents with restrictions on the number of executions.

In short, the present invention is not limited to the above-described embodiments as they are. At a stage of carrying out the invention, the present invention can be embodied by modifying constituent elements without deviating from the spirit of the invention. In addition, a variety of inventions can be formed by a proper combination of a plurality of constituent elements disclosed in the above-described embodiments. For example, some constituent elements may be eliminated from all the constituent elements disclosed in the embodiments. Further, constituent elements according to different embodiments may be properly combined.

Further, in the above described embodiments, a source device and a render device are described as a separate apparatus; however one device, for example, an information terminal can implement both functions executed by the source device and those executed by the render device.

What is claimed is:

1. An information terminal which is configured to operate as one of a source terminal and rendering terminal,
    wherein the information terminal, operating as the source terminal, comprises:
        a storing unit configured to store an encoded content;
        a first receiving unit configured to receive a rights object including rights information assigned to the encoded content and key information used to decode the encoded content, wherein the rights object is encoded using a public key and is transferred from a rights server via a communication network;
        a first decoding unit configured to decode the encoded rights object using a secret key paired with the public key;
        an extracting unit configured to extract the key information from the decoded rights object;

a first session establishing unit configured to perform mutual authentication with another information terminal operating as the rendering terminal, and establish a secure session with the other information terminal operating as the rendering terminal if legitimacy thereof is authorized as a result of the mutual authentication;

a first generating unit configured to generate a first common key; and an encoding unit configured to encode the extracted key information corresponding to the encoded content by using the first common key generated by the first generating unit, and transmit the encoded key information to the other information terminal operating as the rendering terminal via the secure session, and wherein the information terminal, operating as the rendering terminal, comprises:

an acquiring unit configured to acquire the encoded content;

a second session establishing unit configured to perform mutual authentication with another information terminal operating as the source terminal, and establish the secure session with the other information terminal operating as the source terminal if legitimacy thereof is authorized as a result of the mutual authentication;

a second generating unit configured to generate a second common key that is identical to the first common key generated by the first generating unit;

a second receiving unit configured to receive the encoded key information transmitted from the other information terminal operating as the source terminal via the secure session;

a second decoding unit configured to decode the received encoded key information by using the second common key generated by the second generating unit;

a playing back unit configured to decode and playback the acquired encoded content by using the key information decoded by the second decoding unit; and a discarding unit configured to discard the decoded key information after end of playback of the decoded content.

2. The information terminal according to claim 1, wherein the information terminal, operating as the source terminal, further comprises a decrementing unit configured to decrement information for limiting a playback count every time the encoded key information is transmitted to the other information terminal operating as the rendering terminal, when said rights object includes the information for limiting the playback count.

3. The information terminal according to claim 1, wherein the information terminal, operating as the source terminal, further comprises a transmitting unit configured to transmit invalid key information to the other information terminal operating as the rendering terminal after the playback of the encoded content has terminated at the other information terminal operating as the rendering terminal, and wherein when the information terminal operates as the rendering terminal, the discarding unit receives the invalid key information transmitted from the other information terminal operating as the source terminal, and rewrites the decoded key information used to decode the encoded content with the received invalid key information.

4. An information terminal which is configured to operate as one of a source terminal and rendering terminal, wherein the information terminal, operating as the source terminal, comprises:

a storing unit configured to store an encoded game content;

a first receiving unit configured to receive a rights object including rights information assigned to the encoded game content and key information used to decode the encoded game content, wherein the rights object is encoded using a public key and transferred from a rights server via a communication network;

a first decoding unit configured to decode the encoded rights object using a secret key paired with the public key;

an extracting unit configured to extract the key information from the decoded rights object;

a first session establishing unit configured to perform mutual authentication with another information terminal operating as the rendering terminal, and establish a secure session with the other information terminal operating as the rendering terminal if legitimacy thereof is authorized as a result of the mutual authentication;

a first generating unit configured to generate a first common key; and an encoding unit configured to encode the extracted key information corresponding to the encoded game content by using the first common key generated by the first generating unit, and transmit the encoded key information to the other information terminal operating as the rendering terminal via the secure session, and wherein the information terminal, operating as the rendering terminal, comprises:

an acquiring unit configured to acquire the encoded game content;

a second session establishing unit configured to perform mutual authentication with another information terminal operating as the source terminal, and establish the secure session with the other information terminal operating as the source terminal if legitimacy thereof is authorized as a result of the mutual authentication;

a second generating unit configured to generate a second common key that is identical to the first common key generated by the first generating unit;

a second receiving unit configured to receive the encoded key information transmitted from the other information terminal operating as the source terminal via the secure session;

a second decoding unit configured to decode the received encoded key information by using the second common key generated by the second generating unit;

an executing unit configured to decode and execute the acquired encoded game content by using the key information decoded by the second decoding unit; and a discarding unit configured to discard the decoded key information after end of execution of the decoded game content.

5. The information terminal according to claim 4, wherein the information terminal, operating as the source terminal, further comprises a decrementing unit configured to decrement information for limiting an execution count every time the encoded key information is transmitted to the other information terminal operating as the rendering terminal, when said rights object includes the information for limiting the execution count.

6. The information terminal according to claim 4, wherein the information terminal, operating as the source terminal, further comprises a transmitting unit configured to transmit invalid key information to the other information terminal operating as the rendering terminal after the execution of the encoded game content has terminated in the other information terminal operating as the rendering terminal, and wherein when the information terminal operates as the rendering terminal, the discarding unit receives the invalid key information transmitted from the other information terminal operating as the source terminal, and rewrites the decoded key information used to decode the encoded game content with the received invalid key information.

7. The information terminal according to claim 4, wherein the information terminal, operating as the source terminal, further comprises a decrementing unit configured to decrement information for limiting an execution count every time an execution end notification of the encoded game content is sent from the other information terminal operating as the rendering terminal, when said rights object includes the information for limiting the execution count.

8. The information terminal according to claim 1, wherein the information terminal, operating as the source terminal, further comprises a decrementing unit configured to decrement information for limiting a playback count every time a playback end notification of the encoded content is sent from the other information terminal operating as the rendering terminal, when said rights object includes the information for limiting the playback count.

9. A content reproduction method comprising:
storing, in an information terminal operating as a source terminal, an encoded content, and a rights object that includes rights information assigned to the encoded content and key information used to decode the encoded content, wherein the rights object is encoded using a public key and is transferred from a rights server via a communication network;
decoding, in the information terminal operating as the source terminal, the encoded rights object using a secret key paired with the public key;
extracting, in the information terminal operating as the source terminal, the key information from the decoded rights object;
acquiring the encoded content, in an information terminal operating as a rendering terminal;
performing a mutual authentication between the information terminal operating as the source terminal and the information terminal operating as the rendering terminal, and if legitimacy of the information terminal operating as the source terminal and the information terminal operating as the rendering terminal is authorized as a result of the mutual authentication, establishing a secure session between the information terminal operating as the source terminal and the information terminal operating as the rendering terminal;
generating a first common key in the information terminal operating as the source terminal and a second common key the information terminal operating as the rendering terminal, wherein the first and second common keys are identical;
encoding the extracted key information corresponding to the encoded content by the generated first common key, and transmitting the encoded key information to the information terminal operating as the rendering terminal via the secure session;
receiving the encoded key information transmitted from the information terminal operating as the source terminal via the secure session;
decoding the received encoded key information by using the generated second common key;
decoding and playing back the encoded content acquired in the information terminal operating as the rendering terminal by using the decoded key information; and
discarding the decoded key information after end of playback of the decoded content.

10. The content reproduction method according to claim 9, further comprising decrementing information for limiting a playback count every time the encoded key information is transmitted to the information terminal operating as the rendering terminal, when said rights object includes the information for limiting the playback count.

11. The content reproduction method according to claim 9, further comprising:
transmitting invalid key information to the information terminal operating as the rendering terminal after the playback of the encoded content has terminated at the information terminal operating as the rendering terminal, and
receiving the invalid key information transmitted from the information terminal operating as the source terminal, and rewriting the decoded key information used to decode the encoded content with the received invalid key information.

12. The content reproduction method according to claim 9, further comprising decrementing information for limiting a playback count every time a playback end notification of the encoded content is sent from the information terminal operating as the rendering terminal, when said rights object includes the information for limiting the playback count.

13. A content reproduction method comprising:
storing, in an information terminal operating as a source terminal, an encoded game content, and a rights object that includes rights information assigned to the encoded game content and key information used to decode the encoded game content, wherein the rights object is encoded using a public key and is transferred from a rights server via a communication network;
decoding, in the information terminal operating as the source terminal, the encoded rights object using a secret key paired with the public key;
extracting, in the information terminal operating as the source terminal, the key information from the decoded rights object;
acquiring the encoded game content, in an information terminal operating as a rendering terminal;
performing a mutual authentication between the information terminal operating as the source terminal and the information terminal operating as the rendering terminal, and if legitimacy of the information terminal operating as the source terminal and the information terminal operating as the rendering terminal is authorized as a result of the mutual authentication, establishing a secure session between the information terminal operating as the source terminal and the information terminal operating as the rendering terminal;
generating a first common key in the information terminal operating as the source terminal and a second common key the information terminal operating as the rendering terminal, wherein the first and second common keys are identical;
encoding the extracted key information corresponding to the encoded game content by the generated first common key, and transmitting the encoded key information to the information terminal operating as the rendering terminal via the secure session;

receiving the encoded key information transmitted from the information terminal operating as the source terminal via the secure session;

decoding the received encoded key information by using the generated second common key;

decoding and executing the encoded game content acquired in the information terminal operating as the rendering terminal by using the decoded key information; and discarding the decoded key information after end of execution of the decoded game content.

14. The content reproduction method according to claim 13, further comprising decrementing information for limiting an execution count every time the encoded key information is transmitted to the information terminal operating as the rendering terminal, when said rights object includes the information for limiting the execution count.

15. The content reproduction method according to claim 13, further comprising:

transmitting invalid key information to the information terminal operating as the rendering terminal after the execution of the encoded game content has terminated in the information terminal operating as the rendering terminal, and receiving the invalid key information transmitted from the information terminal operating as the source terminal, and rewriting the decoded key information used to decode the encoded game content with the received invalid key information.

16. The content reproduction method according to claim 13, further comprising decrementing information for limiting an execution count every time an execution end notification of the encoded game content is sent from the information terminal operating as the rendering terminal, when said rights object includes the information for limiting the execution count.

17. The information terminal according to claim 1, wherein during the mutual authentication, the information terminals operating as the source terminal and the rendering terminal respectively generate the first and second common keys that are identical to each other.

18. The information terminal according to claim 4, wherein during the mutual authentication, the information terminals operating as the source terminal and the rendering terminal respectively generate the first and second common keys that are identical to each other.

19. An information terminal which is configured to operate as one of a source terminal and rendering terminal, wherein the information terminal, operating as the source terminal, comprises:

a storing unit configured to store an encoded content;

a first receiving unit configured to receive a rights object including rights information assigned to the encoded content and key information used to decode the encoded content, wherein the rights object is encoded using a first public key and is transferred from a rights server via a communication network;

a first decoding unit configured to decode the encoded rights object by using a first secret key paired with the first public key;

an extracting unit configured to extract the key information from the decoded rights object;

a first acquiring unit configured to acquire a second public key of another information terminal operating as the rendering terminal; and an encoding unit configured to encode the extracted key information by using the second public key acquired by the first acquiring unit, and transmit the encoded key information to the other information terminal operating as the rendering terminal, and wherein the information terminal, operating as the rendering terminal, comprises:

a second acquiring unit configured to acquire the encoded content;

a second receiving unit configured to receive the encoded key information transmitted from another information terminal operating as the source terminal;

a second decoding unit configured to decode the received encoded key information by using a secret key paired with the second public key;

a playing back unit configured to decode and playback the acquired encoded content by using the key information decoded by the second decoding unit; and a discarding unit configured to discard the decoded key information after end of playback of the decoded content.

20. The information terminal according to claim 19, wherein the information terminal, operating as the source terminal, further comprises a decrementing unit configured to decrement information for limiting a playback count every time the encoded key information is transmitted to the other information terminal operating as the rendering terminal, when said rights object includes the information for limiting the playback count.

21. The information terminal according to claim 19, wherein the information terminal, operating as the source terminal, further comprises a decrementing unit configured to decrement information for limiting a playback count every time a playback end notification of the encoded content is sent from the other information terminal operating as the rendering terminal, when said rights object includes the information for limiting the playback count.

* * * * *